United States Patent
Ross

(10) Patent No.: US 9,115,685 B2
(45) Date of Patent: Aug. 25, 2015

(54) TIDAL STREAM GENERATOR

(71) Applicant: Linell Renewables Limited, Renfrewshire (GB)

(72) Inventor: Robert Ross, Largs (GB)

(73) Assignee: Linell Renewables Limited, Renfrewshire (GB)

( * ) Notice: Subject to any disclaimer, the term of this patent is extended or adjusted under 35 U.S.C. 154(b) by 0 days.

(21) Appl. No.: 14/348,811

(22) PCT Filed: Sep. 19, 2012

(86) PCT No.: PCT/GB2012/052309
§ 371 (c)(1),
(2) Date: Mar. 31, 2014

(87) PCT Pub. No.: WO2013/054085
PCT Pub. Date: Apr. 18, 2013

(65) Prior Publication Data
US 2014/0284925 A1    Sep. 25, 2014

(30) Foreign Application Priority Data
Oct. 11, 2011    (GB) .................................. 1117554.4

(51) Int. Cl.
*F03B 13/10* (2006.01)
*F03B 13/12* (2006.01)
(Continued)

(52) U.S. Cl.
CPC .............. *F03B 13/10* (2013.01); *F03B 13/264* (2013.01); *F03B 15/00* (2013.01); *F03B 17/063* (2013.01);
(Continued)

(58) Field of Classification Search
USPC ................................. 290/42, 54, 55; 415/4 X
See application file for complete search history.

(56) References Cited

U.S. PATENT DOCUMENTS 3,870,270 A * 3/1975 Holtz .......................... 248/406.1
3,870,271 A * 3/1975 Bowman ..................... 248/406.2
(Continued)

FOREIGN PATENT DOCUMENTS

EP    2302205 A1    3/2011
FR    2879679 A1    6/2006
(Continued)

OTHER PUBLICATIONS

International Search Report for PCT/GB2012/052309, Mar. 6, 2013, 4 pgs.
(Continued)

*Primary Examiner* — Pedro J Cuevas
(74) *Attorney, Agent, or Firm* — Drinker Biddle & Reath LLP

(57) ABSTRACT

A generating apparatus for generating electrical power from a horizontal water flow comprises a fixed hub on a support structure and a power wheel arranged for rotation about a vertical axis about the hub. The power wheel includes rotor vanes adapted to cause rotation of the power wheel when the power wheel is subject to a substantially horizontal water flow. One or more generators are provided on the hub to produce electrical power output from rotation of the power wheel relative to the hub. A shroud is rotationally mounted on the hub and arranged to cover at least some of the rotor vanes of the power wheel, so that the water flow is concentrated on the rotor vanes on one side only of the power wheel. A directional controller holds the shroud in a predetermined rotational position relative to the hub dependent on the direction of the water flow.

40 Claims, 13 Drawing Sheets

(51) Int. Cl.
*H02P 9/04* (2006.01)
*F03B 13/26* (2006.01)
*F03B 17/06* (2006.01)
*F03B 15/00* (2006.01)
*F03B 13/00* (2006.01)
*F03D 9/00* (2006.01)

(52) U.S. Cl.
CPC ....... *F05B 2220/706* (2013.01); *F05B 2240/13* (2013.01); *F05B 2240/61* (2013.01); *F05B 2240/97* (2013.01); *F05B 2270/18* (2013.01); *Y02E 10/28* (2013.01)

(56) References Cited

U.S. PATENT DOCUMENTS

| | | | | |
|---|---|---|---|---|
| 3,872,854 A * | 3/1975 | Raser | | 126/606 |
| 3,928,771 A * | 12/1975 | Straumsnes | | 290/43 |
| 4,084,918 A * | 4/1978 | Pavlecka | | 415/1 |
| 4,088,419 A * | 5/1978 | Hope et al. | | 415/4.4 |
| 4,156,580 A * | 5/1979 | Pohl | | 415/4.2 |
| 4,174,923 A * | 11/1979 | Williamson | | 415/211.1 |
| 4,191,505 A * | 3/1980 | Kaufman | | 415/2.1 |
| 4,278,896 A * | 7/1981 | McFarland | | 290/55 |
| 4,288,200 A * | 9/1981 | O'Hare | | 415/4.4 |
| 4,295,783 A * | 10/1981 | Lebost | | 415/4.4 |
| 4,350,900 A * | 9/1982 | Baughman | | 290/55 |
| 4,486,143 A * | 12/1984 | McVey | | 415/164 |
| 4,551,631 A * | 11/1985 | Trigilio | | 290/55 |
| 4,764,683 A * | 8/1988 | Coombes | | 290/55 |
| 4,834,610 A * | 5/1989 | Bond, III | | 415/53.3 |
| 4,960,363 A * | 10/1990 | Bergstein | | 415/3.1 |
| 5,009,569 A * | 4/1991 | Hector et al. | | 415/4.1 |
| 5,038,049 A * | 8/1991 | Kato | | 290/55 |
| 5,083,899 A * | 1/1992 | Koch | | 415/2.1 |
| 5,332,354 A * | 7/1994 | Lamont | | 415/4.2 |
| 5,447,412 A * | 9/1995 | Lamont | | 415/4.2 |
| 5,850,108 A * | 12/1998 | Bernard | | 290/54 |
| 5,969,430 A * | 10/1999 | Forrey | | 290/54 |
| 6,158,953 A * | 12/2000 | Lamont | | 415/4.4 |
| 6,270,308 B1 * | 8/2001 | Groppel | | 415/4.3 |
| 6,638,005 B2 * | 10/2003 | Holter et al. | | 415/4.2 |
| 6,652,221 B1 * | 11/2003 | Praenkel | | 415/3.1 |
| 6,674,181 B2 * | 1/2004 | Harbison | | 290/55 |
| 6,808,366 B2 * | 10/2004 | Sikes | | 416/1 |
| 6,942,454 B2 * | 9/2005 | Ohlmann | | 416/11 |
| 6,981,839 B2 * | 1/2006 | Fan | | 415/4.1 |
| 7,307,356 B2 * | 12/2007 | Fraenkel | | 290/54 |
| 7,323,791 B2 * | 1/2008 | Jonsson | | 290/55 |
| 7,679,209 B2 * | 3/2010 | Rashidi | | 290/55 |
| 7,682,127 B2 * | 3/2010 | Paul | | 415/4.2 |
| 7,744,338 B2 * | 6/2010 | DeRuyter et al. | | 415/2.1 |
| 7,816,802 B2 * | 10/2010 | Green | | 290/55 |
| 8,083,438 B2 * | 12/2011 | Bailey et al. | | 405/195.1 |
| 8,096,749 B2 * | 1/2012 | Yang | | 415/4.2 |
| 8,167,533 B2 * | 5/2012 | Lucy et al. | | 415/4.2 |
| 8,297,910 B2 * | 10/2012 | DeRuyter et al. | | 415/2.1 |
| 8,360,713 B2 * | 1/2013 | Carosi et al. | | 415/4.2 |
| 8,432,056 B2 * | 4/2013 | Bailey et al. | | 290/54 |
| 8,591,170 B1 * | 11/2013 | Rawls | | 415/4.2 |
| 8,616,830 B2 * | 12/2013 | Unno | | 415/4.2 |
| 8,777,556 B2 * | 7/2014 | O'Neil | | 415/4.1 |
| 8,829,704 B2 * | 9/2014 | Grigg | | 290/54 |
| 8,840,360 B2 * | 9/2014 | Quintal | | 415/4.1 |
| 8,946,923 B2 * | 2/2015 | Steel | | 290/54 |
| 2002/0153728 A1 * | 10/2002 | Groppel | | 290/44 |
| 2004/0047732 A1 | 3/2004 | Sikes | | 416/1 |
| 2006/0244267 A1 * | 11/2006 | Fraenkel | | 290/54 |
| 2009/0155074 A1 | 6/2009 | Sankar | | 416/44 |
| 2010/0135768 A1 * | 6/2010 | Pitre | | 415/7 |
| 2010/0148509 A1 | 6/2010 | Ortiz | | 290/53 |
| 2010/0213271 A1 * | 8/2010 | Bailey et al. | | 239/14.1 |
| 2010/0213716 A1 | 8/2010 | Santoro | | 290/54 |
| 2010/0213720 A1 * | 8/2010 | Bailey et al. | | 290/55 |
| 2011/0187112 A1 | 8/2011 | Brace | | 290/54 |
| 2012/0187698 A1 * | 7/2012 | Bassett | | 290/55 |
| 2013/0333370 A1 * | 12/2013 | Hopper | | 60/495 |

FOREIGN PATENT DOCUMENTS

| | | |
|---|---|---|
| GB | 2348250 A | 9/2000 |
| GB | 2348250 B | 8/2003 |
| GB | 2445755 A | 7/2008 |
| WO | 2008050149 A1 | 5/2008 |
| WO | 2010042069 A2 | 4/2010 |
| WO | 2010064770 A1 | 6/2010 |

OTHER PUBLICATIONS

International Preliminary Report on Patentability for PCT/GB2012/052309, Dec. 2, 2013, 17 pgs.

UK Intellectual Property Office, Search Report, Jan. 23, 2012, 8 pages.

* cited by examiner

TIDAL STREAM GENERATOR

FIELD OF THE INVENTION

This invention relates to a generating apparatus for generating electrical power from a substantially horizontal water flow, for example tidal flow or river flow.

BACKGROUND OF THE INVENTION

Tidal stream generators generally use vanes or blades which rotate about a horizontal axis. GB 2 348 250 A describes a tidal stream generator which includes a support column mounted on a river or sea bed. The generator includes a turbine unit with blades which rotate about a horizontal axis. The turbine unit can be moved up and down the column by means of a cylindrical tank held inside the column. Water can be removed from the tank by displacing it with compressed air to lift the tank by buoyancy to a position in which the tank projects above the surface of the water. The turbine unit is fixed to the tank, so that when the tank is in its lifted position the turbine unit is at least partially above the surface of the water. The support column has a longitudinal slot to allow the turbine unit, which is fixed to the tank held inside the column, to rise and fall with the tank. The support column is weakened by the provision of the longitudinal slot. The turbine unit can face in one direction only, so that the generator can generate maximum power only when the tidal flow is parallel to the axis of rotation of the turbine unit.

It is known to provide a tidal stream generator with vanes which rotate about a vertical axis. WO 2008/050149 A1 discloses a tidal stream generator comprising a moored floating pontoon with a horizontal duct extending therethrough. A turbine is mounted in the duct on a vertical axis, and vertical deflector vanes in the duct deflect the water flow onto the vanes of the turbine. The turbine can only be positioned at a level just below the surface of the water. The pontoon is moored in a fixed position and can only generate maximum power when the tidal flow is parallel to longitudinal axis of the duct.

A further problem with prior art tidal stream generators is that they are optimised to work at a particular tidal flow rate. A rotary electric generator is designed to provide its maximum efficiency at a particular rotary speed. A water turbine in a tidal power generator apparatus is rotationally coupled to the electric generator, such that as the tidal flow rate increases, the water speed of the water turbine increases, and the rotary speed of the electric generator increases. At tidal flow rates higher or lower than the design tidal rate, the generator does not operate at its maximum efficiency.

It is an object of the present invention to overcome one or more of the above problems.

DISCLOSURE OF THE INVENTION

According to a first aspect of the invention there is provided a generating apparatus for converting kinetic energy from a substantially horizontal water flow to electrical energy, the apparatus comprising:
 a rotationally fixed hub;
 a power wheel arranged for rotation about a substantially vertical axis about the hub and provided with rotor vanes adapted to cause rotation of the power wheel when the power wheel is subject to a substantially horizontal water flow;
 a shroud rotationally mounted on the hub and arranged to cover at least some of the rotor vanes of the power wheel;
 a directional controller adapted to hold the shroud in a predetermined rotational position relative to the hub dependent on the direction of the substantially horizontal water flow; and
 at least one generator provided on the hub and adapted to produce electrical power output derived from rotation of the power wheel relative to the hub.

The hub is not limited to any particular shape or construction and may comprise any part or parts of a fixed or moveable structure about which the power wheel is arranged for rotation. The shroud may be rotationally mounted directly to the power wheel or to the hub, such that the shroud is either directly or indirectly rotationally mounted to the hub.

The power wheel may be rotationally mounted to the hub by rotary bearings. The shroud may be rotationally mounted to the hub or to the power wheel by rotary bearings. The power wheel and the shroud may each have controlled buoyancy, for example buoyant chambers which may be partially flooded to control the buoyancy, to minimise the vertical loads transferred through the rotary bearings.

The shroud may extend over at least 180° and substantially cover at least half of the rotor vanes of the power wheel at any instant. In practice the optimum extent of coverage may be determined by testing, and may be more or less than 180° and more or less than half the vanes.

The shroud may substantially cover at least some of the rotor vanes moving in a direction opposed to the direction of the substantially horizontal water flow.

The shroud may be continuous. The shroud may include a plurality of vertically extending apertures or slots. The apertures or slots may be adjacent to rotor vanes moving in a direction opposed to the direction of the substantially horizontal water flow. The shroud may be shaped to create a region of reduced pressure adjacent to at least some of the plurality of vertically extending apertures or slots.

The shroud may include a plurality of shroud vanes adapted to divert water flow away from the vertical axis. The shroud vanes may be adapted to create regions of low pressure adjacent to at least some of the rotor vanes moving in a direction opposed to the direction of the substantially horizontal water flow, for example by promoting vortex shedding at the trailing edge of the shroud vanes.

The directional controller may comprise a directional vane connected to the shroud and extending radially away from the shroud. The directional vane may include a trimming device adapted to trim the rotational position of the shroud. The trimming device may comprise a pivotable flange, for example a trim tab or servo tab, at the trailing edge of the directional vane. The trimming device may be pivotally adjustable. Adjustment of the trimming device may be manually or automatically controlled, for example by hydraulic rams.

The directional controller may comprise a flow separator connected to the shroud radially in a location substantially diametrically opposite the directional vane, the flow separator being shaped so as to divert at least part of the substantially horizontal water flow onto the rotor vanes of the power wheel. The flow separator may include an inlet duct. The duct may include a venturi throat. The inlet duct may include pivotally adjustable inlet guide vanes adapted to increase the velocity of the substantially horizontal water flow onto the rotor vanes of the power wheel. Adjustment of the inlet guide vanes may be manually or automatically controlled, for example by hydraulic rams.

The directional controller may be fixed to the shroud. The directional controller may be integral with the shroud.

The flow separator may be shaped so as to divert at least part of the substantially horizontal water flow onto the shroud vanes of the shroud. The shroud vanes may be provided on that part of the shroud extending from the flow separator to an intermediate point on the shroud approximately 90° from the flow separator with respect to the vertical axis. In other words a radial line from the vertical axis to the flow separator forms an angle of approximately 90° to a radial line from the vertical axis to the intermediate point.

According to a second aspect of the invention there is provided a method of generating electricity from a substantially horizontal water flow in a body of water using a generating apparatus including a power wheel arranged for rotation about a substantially vertical axis about a hub rotationally fixed to a support structure, the power wheel having a plurality of rotor vanes, the method comprising the steps of:

providing a shroud rotationally mounted on the hub and arranged to cover at least some of the rotor vanes of the power wheel;

fixing the hub in an operating position in the substantially horizontal water flow;

aligning the shroud with the substantially horizontal water flow such that the rotor vanes on a first side of the generating apparatus are not covered by the shroud and are subject to hydrodynamic forces from the substantially horizontal water flow, and such that the rotor vanes on a second side of the generating apparatus are at least partially covered by the shroud so as to at least partially shield the rotor vanes from hydrodynamic forces from the substantially horizontal water flow; and driving one or more generators provided on the hub from the rotation of the power wheel.

The step of aligning the shroud may be carried out by providing a directional controller on the shroud adapted to hold the shroud in a predetermined rotational position relative to the hub dependent on the direction of the substantially horizontal water flow.

The directional controller may comprise a directional vane connected to the shroud and extending radially away from the shroud, and the step of aligning the shroud may include allowing the shroud to adopt an equilibrium position such that the directional vane is substantially aligned with the substantially horizontal water flow.

The step of aligning the shroud may include the further step of trimming the rotational position of the shroud, for example by adjusting the position of a pivotable flange, for example a trim tab or servo tab, at the trailing edge of the directional vane. The adjustment may be manual or automatic.

The method may include the further step of separating the substantially horizontal water flow at the generating apparatus so as to divert at least part of the substantially horizontal water flow onto the rotor vanes of the power wheel on the first side of the generating apparatus and to divert at least part of the substantially horizontal water flow past the shroud on the second side of the generating apparatus.

The separating step may be carried out by a flow separator connected to the shroud radially in a location substantially diametrically opposite the directional vane. The flow separator may divert at least part of the substantially horizontal water flow through an inlet duct onto the rotor vanes of the power wheel on the first side of the generating apparatus. The duct may include a venturi throat. The method may include the step of controlling pivotally adjustable inlet guide vanes to increase the velocity of the substantially horizontal water flow onto the rotor vanes of the power wheel on the first side of the generating apparatus.

The method may include the step of providing a plurality of vertically extending apertures or slots adjacent to rotor vanes moving in a direction opposed to the direction of the substantially horizontal water flow and creating a region of reduced pressure adjacent to at least some of the plurality of vertically extending apertures or slots.

The method may include the step of providing a plurality of shroud vanes and creating regions of low pressure adjacent to at least some of the rotor vanes moving in a direction opposed to the direction of the substantially horizontal water flow, for example by promoting vortex shedding at the trailing edge of the shroud vanes.

The third and fourth aspects of the invention relate to a buoyant submersible vertical axis tidal stream generator. Any or all of the features of the third or fourth aspects of the invention can be combined with the features of the first or second aspects of the invention.

According to a third aspect of the invention there is provided a generating apparatus for converting kinetic energy from a substantially horizontal water flow to electrical energy, the apparatus comprising:

a support structure;

a hub rotationally fixed to the support structure;

a hub level controller adapted to control the level of the hub on the support structure;

a power wheel arranged for rotation about a substantially vertical axis about the hub and provided with rotor vanes adapted to cause rotation of the power wheel when the power wheel is subject to a substantially horizontal water flow; and one or more generators provided on the hub and adapted to produce electrical power output derived from rotation of the power wheel relative to the hub.

The hub may include an aperture through which the support structure extends.

The support structure may be a substantially vertical support column. The support structure may be fixed to a bed beneath the substantially horizontal water flow. The support structure may include a stop member adapted to prevent the hub from moving below an operating position.

The support structure may include one or more guide means which engage with one or more key means on the hub to prevent relative rotation of the support structure and hub. The guide means may be male or female guide means, such as vertically extending splines or channels. The key means may be female or male key means adapted to engage with the guide means, such as vertically extending channels or dogs.

The hub level controller may comprise one or more floodable ballast chambers provided on the hub.

Each generator may be provided in a generator chamber having an opening in a roof of said generator chamber and a removable cover sealably covering said opening. Each generator may be liftable through said opening, for example for maintenance purposes, or for removal or replacement.

The apparatus may include a crane provided on the support structure. The crane may be adapted to lift each generator or other component of the apparatus.

The apparatus may include a plurality of hydraulic pumps provided on the hub, each hydraulic pump being adapted to pump hydraulic fluid to drive one or more generators.

Each hydraulic pump may be provided in a pump chamber having an opening in a roof of said pump chamber and a removable cover sealably covering said opening. Each hydraulic pump may be liftable through said opening, for example for maintenance purposes, or for removal or replacement. In one arrangement each pump chamber may be arranged beneath a generator chamber, and each hydraulic pump may be liftable through the opening of the generator chamber. In another arrangement each pump chamber may be arranged laterally adjacent to a generator chamber.

Alternatively, the apparatus may include a plurality of transmissions provided on the hub, each transmission being adapted to transmit a driving force from the power wheel to drive one or more generators.

The generating apparatus may comprise a plurality of hubs, each being rotationally fixed to the support column, and each having an associated power wheel arranged for rotation about a substantially vertical axis about the hub and provided with rotor vanes adapted to cause rotation of the power wheel when the power wheel is subject to a substantially horizontal water flow to drive one or more generators provided on the hub.

According to a fourth aspect of the invention there is provided a method of generating electricity from a substantially horizontal water flow in a body of water using a generating apparatus including a power wheel arranged for rotation about a substantially vertical axis about a hub rotationally fixed to a support structure, the method comprising the steps of:
  moving the hub in a vertical direction on the support structure to an operating position in the substantially horizontal water flow;
  driving the power wheel to rotate about the hub by means of hydrodynamic forces from the substantially horizontal water flow on rotor vanes provided on the power wheel; and
  driving one or more generators provided on the hub from the rotation of the power wheel.

The step of moving the hub in a vertical direction may include lowering the hub by introducing water into one or more floodable ballast chambers provided on the hub. The water may be introduced by pumping the water or by opening one or more openings to allow water to enter the one or more floodable ballast chambers under hydrostatic pressure and/or gravity.

The hub may be arranged to enclose the support structure.

The method may include the step of selecting an optimum level in the substantially horizontal water flow and moving the hub in a vertical direction on the support structure to an operating position at the optimum level.

The support structure may comprise a substantially vertical support column. The support structure may include a stop member and the step of moving the hub in a vertical direction on the support structure may include moving the hub until the hub engages with the stop member when the hub is at a predetermined operating position.

The support structure may include one or more guide means which engage with one or more key means on the hub to prevent relative rotation of the support structure and hub. The guide means may be male or female guide means, such as vertically extending splines or channels. The key means may be female or male key means adapted to engage with the guide means, such as vertically extending channels or dogs.

The method may include the step of lifting the hub in a vertical direction on the support structure to a maintenance position to enable maintenance work to be carried out on the generating apparatus. The maintenance position may be a position in which at least part of the generating apparatus is above the surface of the body of water.

The step of moving the hub to an operating position may include flooding one or more floodable ballast chambers provided on the hub.

The step of lifting the hub to a maintenance position may include displacing water from one or more floodable ballast chambers provided on the hub. The water may be displaced by pumping the water or by displacing the water with air from a compressor.

The method may include the step of lifting one or more generators from an associated generator chamber while the hub is in the maintenance position. The generators may be lifted for maintenance purposes, or for removal or replacement.

The step of lifting one or more generators from an associated generator chamber may be carried out using a crane provided on the support structure.

The generating apparatus may include a plurality of hydraulic pumps provided on the hub, each hydraulic pump being adapted to pump hydraulic fluid to drive one or more generators, and the method may include the step of lifting one or more hydraulic pumps from an associated pump chamber while the hub is in the maintenance position. The hydraulic pumps may be lifted for maintenance purposes, or for removal or replacement.

The fifth and sixth aspects of the invention relate to a tidal stream generator with multiple switchable generating units. Any or all of the features of the fifth or sixth aspects of the invention can be combined with the features of the first, second, third or fourth aspects of the invention.

According to a fifth aspect of the invention there is provided a generating apparatus for converting kinetic energy from a substantially horizontal water flow to electrical energy, the apparatus comprising:
  a rotationally fixed hub;
  a power wheel arranged for rotation about the hub and provided with vanes adapted to cause rotation of the power wheel when the power wheel is subject to a substantially horizontal water flow;
  a plurality of generators provided on the hub, each generator having an associated drive means driven by rotation of the power wheel; and
  generator control means adapted to selectively switch each of said plurality of generators between an active state and an inactive state.

The generator control means may include an electrical controller adapted to selectively switch each of said plurality of generators on and off, for example by switching off the electro-magnetic field of the generator.

The generator control means may include a sensor for detecting a speed parameter indicative of the relative rotational speed of the power wheel and the hub.

The generator control means may include switching means adapted to switch each of said plurality of generators between an active state and an inactive state in response to the detected speed parameter. The generator control means may be adapted to switch more generators to an active state when the detected speed parameter is indicative of an increase in the relative rotational speed of the power wheel and the hub. The generator control means may be adapted to switch a generator to an active state when the detected speed parameter is indicative that the relative rotational speed of the power wheel and the hub has reached a predetermined upper trigger value. The generator control means may be adapted to switch a generator to an inactive state when the detected speed parameter is indicative that the relative rotational speed of the power wheel and the hub has reached a predetermined lower trigger value.

In one embodiment each drive means may comprise:
  a primary driver, for example a pinion, driven by the power wheel;
  a drive shaft for driving the associated generator; and
  a transmission coupled between the pinion and the drive shaft.

The coupling may be direct or indirect.

The apparatus may include a primary transmission comprising a ring gear fixed to the power wheel and adapted to drive each of the primary drivers. The ring gear may be manufactured as one part or may be assembled from a plurality of segmental parts.

Each drive means may include a clutch to selectively engage or disengage the generator from the drive shaft.

In another embodiment each drive means may comprise:
a hydraulic pump provided on the hub, the hydraulic pump being adapted to pump hydraulic fluid;
a primary transmission coupled between the power wheel and the hydraulic pump;
a hydraulic motor associated with the generator; and
hydraulic control means adapted to direct flow of the hydraulic fluid to the hydraulic motor.

The primary transmission may comprise a ring gear fixed to the power wheel and a plurality of pinions, each pinion being coupled by a drive shaft to one of said hydraulic pumps.

The hydraulic control means may include a sensor for detecting a speed parameter indicative of the relative rotational speed of the power wheel and the hub.

The hydraulic control means may include valve switching means adapted to direct flow of said hydraulic fluid to one or more of said hydraulic motors in response to the detected speed parameter. The hydraulic control means may be adapted to selectively direct flow of said hydraulic fluid to more hydraulic motors when the detected speed parameter is indicative of an increase in the relative rotational speed of the power wheel and the hub. The hydraulic control means may be adapted to selectively direct flow of said hydraulic fluid to fewer hydraulic motors when the detected speed parameter is indicative of a decrease in the relative rotational speed of the power wheel and the hub.

The hydraulic control means may include valve switching means adapted to direct or prevent flow of said hydraulic fluid to one or more of said hydraulic motors in response to a predetermined hydraulic fluid flow condition, such as a pressure increase or decrease arising from a fault in a motor or pump or from a leak. The valve switching means may include a hydraulic valve associated with each hydraulic motor. The valve switching means may include a microprocessor to control the valve switching means, or a pressure pilot valve or a negative feedback pilot valve. The valve switching means may include an electrical controller associated with each hydraulic valve, the electrical controller being adapted to open or close the associated hydraulic valve in accordance with a control signal from the microprocessor.

According to a sixth aspect of the invention there is provided a method of generating electricity from a substantially horizontal water flow in a body of water using a generating apparatus including a power wheel arranged for rotation about a substantially vertical axis about a hub rotationally fixed to a support structure, the method comprising the steps of:
driving the power wheel to rotate about the hub by means of hydrodynamic forces from the substantially horizontal water flow on rotor vanes provided on the power wheel;
driving a plurality of drive means from the rotation of the power wheel to pump pressurised hydraulic fluid, each drive means being associated with one of a plurality of generators on the hub;
selectively switching each of said plurality of generators between an active state in which the generator is driven by the associated drive means to generate electrical power and an inactive state in which the generator generates no electrical power; and
generating electrical power from the plurality of generators.

The step of driving a plurality of drive means may include:
driving a plurality of pumps from the rotation of the power wheel to pump pressurised hydraulic fluid; and
selectively directing the pressurised hydraulic fluid to one or more of a plurality of hydraulic motors, each hydraulic motor being associated with one of a plurality of generators on the hub.

The step of driving a plurality of pumps may include driving a plurality of pinions from a ring gear fixed to the power wheel, each pinion being coupled by a drive shaft to one of said hydraulic pumps.

The method may include the step of detecting a rotational speed parameter indicative of the relative rotational speed of the power wheel and the hub.

The method may include the step of detecting a flow speed parameter indicative of the speed of the substantially horizontal water flow.

The step of selectively switching each of said plurality of generators between an active state and an inactive state may include selecting a number of generators to be switched to the active state based on one or both of the detected rotational speed parameter and the detected flow speed parameter.

The step of selectively switching each of said plurality of generators between an active state and an inactive state may include selecting more generators to be switched to the active state when the detected speed parameter is indicative of an increase in the relative rotational speed of the power wheel and the hub or an increase in the speed of the substantially horizontal water flow.

The step of selectively switching each of said plurality of generators between an active state and an inactive state may include selecting fewer generators to be switched to the active state when the detected speed parameter is indicative of a decrease in the relative rotational speed of the power wheel and the hub or a decrease in the speed of the substantially horizontal water flow.

BRIEF DESCRIPTION OF THE DRAWINGS

In this specification the term "tidal stream generator" means a generating apparatus for converting kinetic energy from a substantially horizontal water flow to electrical energy, and includes in its scope apparatus for use in the sea, in an estuary or in a river. The term "sea bed" includes in its scope any bed under a body of water, including an estuary bed or a river bed.

The invention will now be described by way of example only with reference to the following drawings, in which.

DETAILED DESCRIPTION OF THE INVENTION

The operation of the buoyant submersible vertical axis tidal stream generator is as follows.

Figure 1:
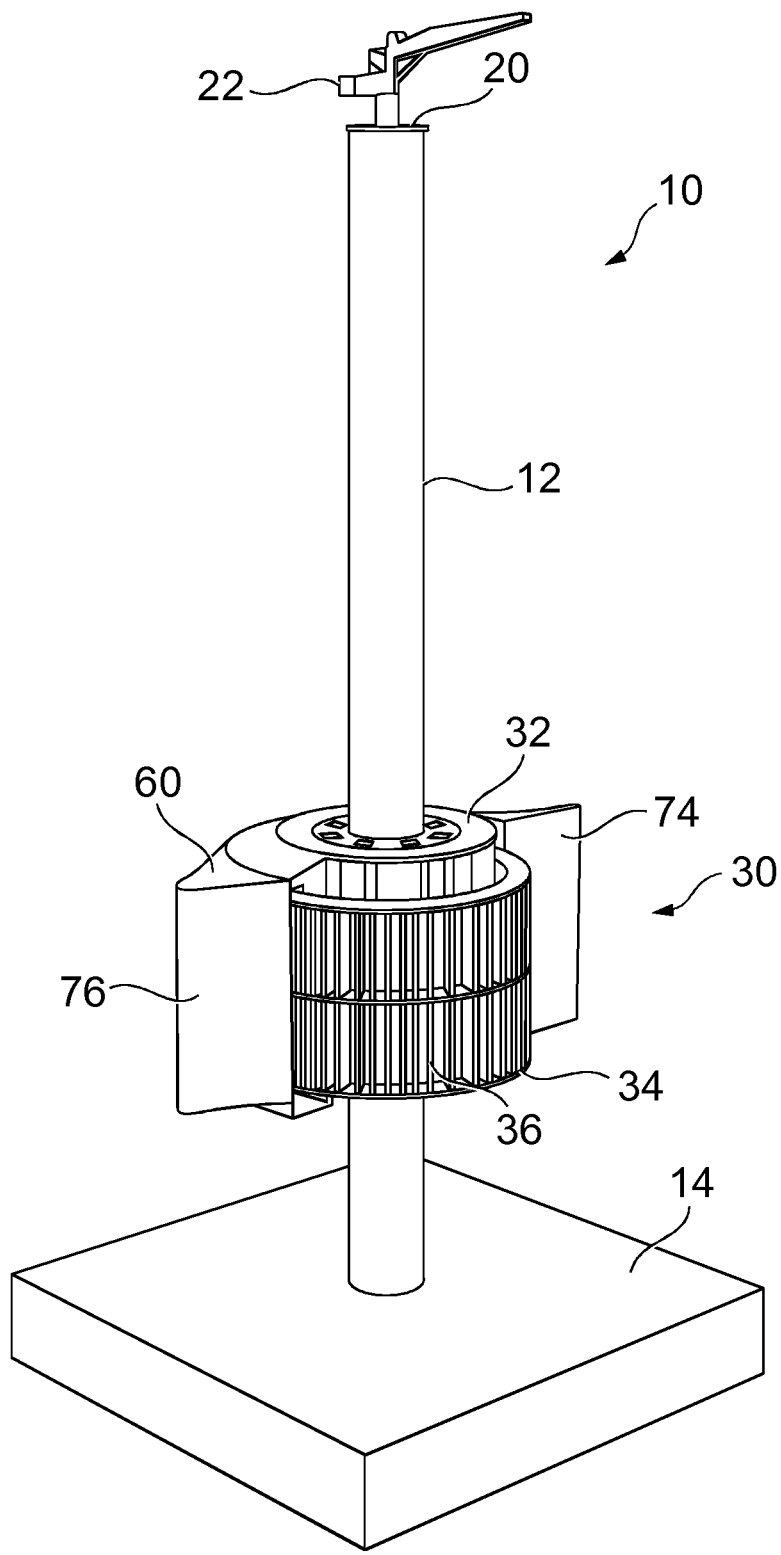
FIG. 1 is a view of a tidal stream generator according to the present invention.
Figure 2:
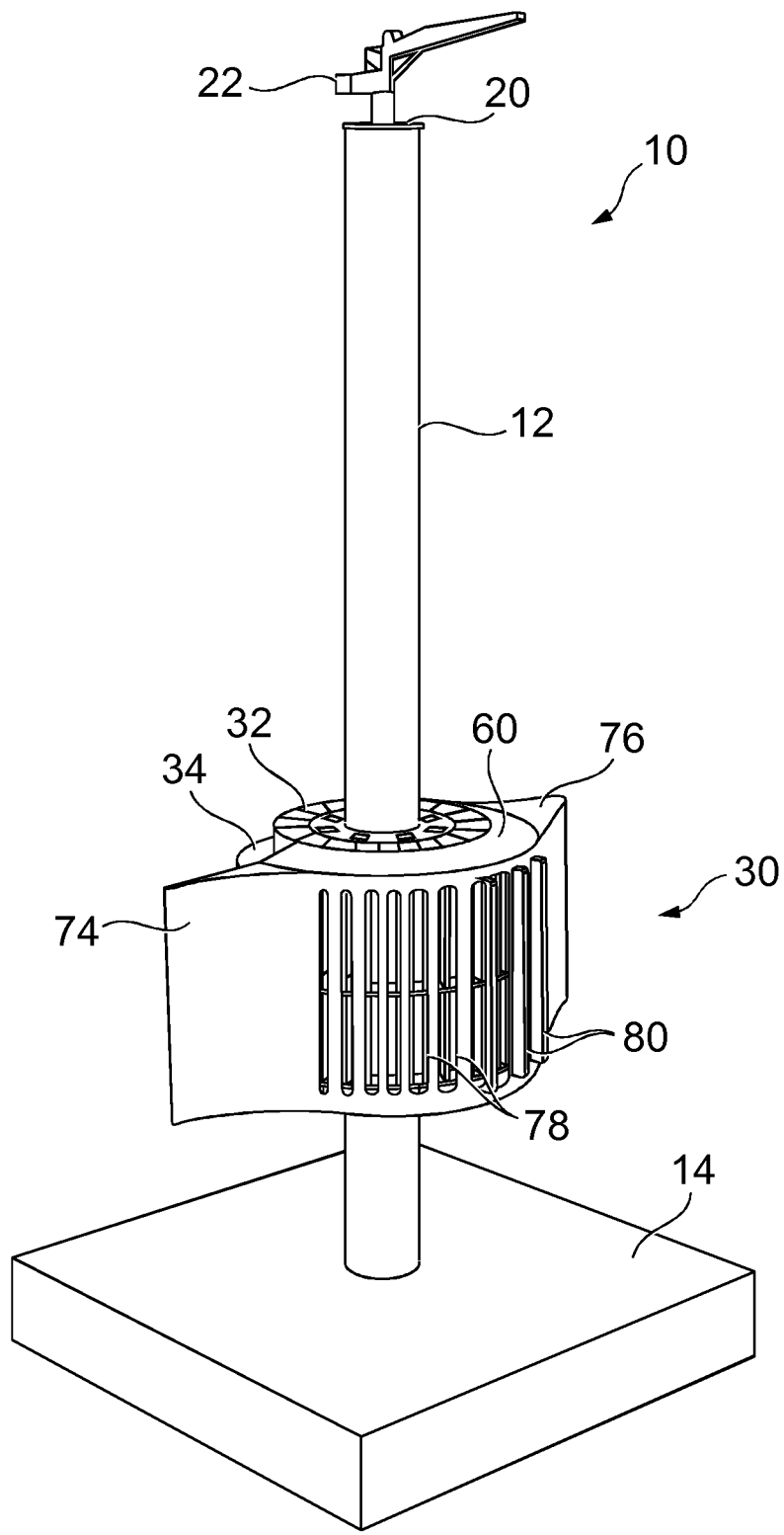
FIG. 2 is a reverse view of the tidal stream generator of FIG. 1.

Referring to FIGS. 1 and 2 there is shown a generating apparatus 10 for converting kinetic energy from a substantially horizontal water flow to electrical energy, commonly referred to as a tidal stream generator. The apparatus includes a substantially vertical support structure 12 which is supported on the sea bed 14. In the illustrated example the support structure is a column fixed to the sea bed by any suitable means, for example the tripod structure 16 illustrated in FIG. 5. The tripod structure 16 may be anchored to the sea bed by three piles which engage in three pile sleeves 18. However any suitable structure may be used, for example a lattice structure or a plurality of columns or piles. Moreover any suitable means of supporting the structure on the sea bed may be used, for example a gravity structure, or direct support by directly driving the column or columns of the support structure into the sea bed.

The column extends vertically from the sea bed to a level above the high water level. On the top of the column 12 is an access platform 20 of the sort well known in marine structures. The support platform can include access facilities to allow access by boat, and it can include a helicopter landing pad to allow access by helicopter. In the illustrated example a crane 22 is provided on the access platform 20, for use in lifting components to and from the generator unit 30, as will be described below.

The generator unit 30 includes a hub 32 which is rotationally fixed to the support column 12 and a power wheel 34 arranged for rotation about a substantially vertical axis about the hub 32. The power wheel 34 is provided with rotor vanes 36 which extend vertically between a top ring 40, a central ring 42 and a bottom ring 44, each of which projects radially from an outer cylinder 46. The vanes 36 are shaped to maximise the transfer of energy from the horizontal flow of water flowing past the generator unit 30 to the power wheel 34, thereby driving the power wheel 34. The hub 32 includes hydraulic brakes (not shown) which can lock the power wheel 34 to the hub 32 to prevent rotation during maintenance and lifting or raising.

Figure 6:
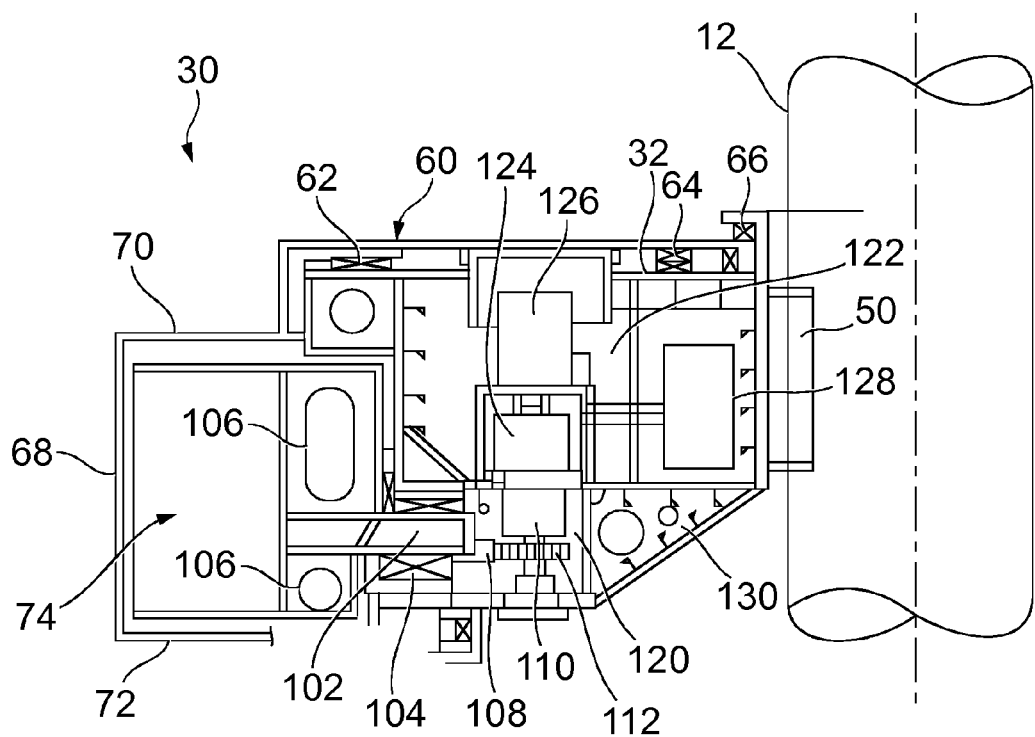
FIG. 6 is a partial sectional view through the hub and power wheel of another tidal stream generator according to the present invention.

The power wheel can be connected to the hub in a number of different ways. In the example of FIG. 6 the power wheel 34 is supported by an inwardly projecting flange 102, which rests on roller bearings 104 for rotation on the hub 32. The power wheel may include a number of buoyant compartments 106 on the inside of the outer cylinder 46. On the inner edge of the flange 102 is a ring gear 108, which has gear teeth projecting radially inwardly to drive a plurality of hydraulic pumps 110 by means of pinions 112, as will be described below.

FIG. 6 shows a radial section through the hub 32. The hub 32 has a general torus shape, and extends around the column 12. It is prevented from rotation about the column by a torque key 50 which engages with a corresponding channel 52 extending longitudinally along the support column 12. If required, the column 12 can have more than one channel 52, for example four channels 52, arranged equidistantly around the perimeter of the column. The hub 32 can then have four torque keys 50, each of which engages a channel 52. Alternatively the channels 52 on the column 12 can be replaced by splines (not shown) which engage in torque slots (not shown) on the hub 32. The hub 32 is free to move in a controlled manner up and down the column 12, by ballasting. One or more stop members 54 are provided on the column 12 to prevent the hub passing below the stop members 54. Typically the stop member may be a fixed ring encircling the column 12, or a number of blocks in the channels 52, placed at a suitable level of maximum tidal flow, so that the generator unit 32 can be lowered to rest on the stop member 34 in its operating position. Typically the operating position is at a depth which allows at least 10 m clearance above the top of the generator unit 30 when the apparatus is installed in navigable tidal waters, to allow vessels with a draft of less than 10 m to pass over the generator unit 30.

The hub 32 includes a number of separate chambers. It may be fabricated in a number of separate segments which are fitted together either off-site or on-site. Typically each chamber extends only part of the way around the circumference, for example for 45°. Radially extending internal bulkheads may be provided to separate adjacent chambers.

The chambers can serve different purposes. A pump chamber 120 houses a hydraulic pump 110. A generator chamber 122 houses a hydraulic motor 124 and an alternator 126. A machinery chamber 128 houses hydraulic and electrical control apparatus and/or compressed air tanks. Ballast chambers 130 are floodable chambers used to control the lifting and lowering of the generator unit 30. The arrangement of chambers shown in FIG. 6 is by way of example only, and the relative positions, shapes and sizes of the chambers may be altered to suit the particular requirements of the generator unit 30.

The generating apparatus includes a hub level controller (not shown) to control the level of the hub 32 on the support column 12. Typically the hub level controller is a microprocessor controlled unit which is capable of processing information from sensors and/or from operator-generated instructions, and is capable of controlling electrical and/or hydraulic and/or pneumatic apparatus which governs the positioning of the hub 32 on the support column 12 or other support structure. The hub 32 is buoyant when the ballast chambers are not flooded, and in the maintenance position floats on the surface of the water. When in the maintenance position the power wheel 34 is locked, for example by a hydraulically controlled locking pin, to prevent its rotation relative to the hub 32. The hub level controller controls the ballasting of the ballast chambers 130 to lower and raise the hub 32 on the column 12. To lower the hub 32 the hub level controller controls the opening of ports to admit water into the ballast chambers 130. The hub level controller can be controlled remotely by radio link from shore or ship. When the ballast chambers are full the hub 32 is lowered under gravity until it reaches the stop member 54, which is positioned so that the generator unit 32 is at the optimum working position. To raise the hub 32 the hub level controller controls a compressor which pumps air into the ballast chambers 130 to displace the water. When the ballast chambers are sufficiently empty the hub 32 is raised under its own buoyancy until it reaches the surface where it floats in the maintenance position. Any suitable ballasting system may be used, including water pump ballast systems.

The hub 32 includes one or more generators provided on the hub and adapted to produce electrical power output derived from rotation of the power wheel 34 relative to the hub 32. In the illustrated example there are eight generators in the form of alternators 126, each provided in a separate generator chamber 122. Each alternator 126 is driven by a hydraulic motor 124, which is also in the generator chamber 122, and which itself is driven by pumped hydraulic fluid. The pumped hydraulic fluid is produced by the eight hydraulic pumps 110, each being driven by the gear ring 108 of the power wheel 34. Each hydraulic pump 110 is provided in a separate pump chamber 120.

A hydraulic controller, described in more detail below, controls the flow of the pumped hydraulic fluid produced by the eight hydraulic pumps 110 to the required number of hydraulic motors 124, which in the example can be any number between one and eight, depending on the speed of the tidal flow.

Figure 7:
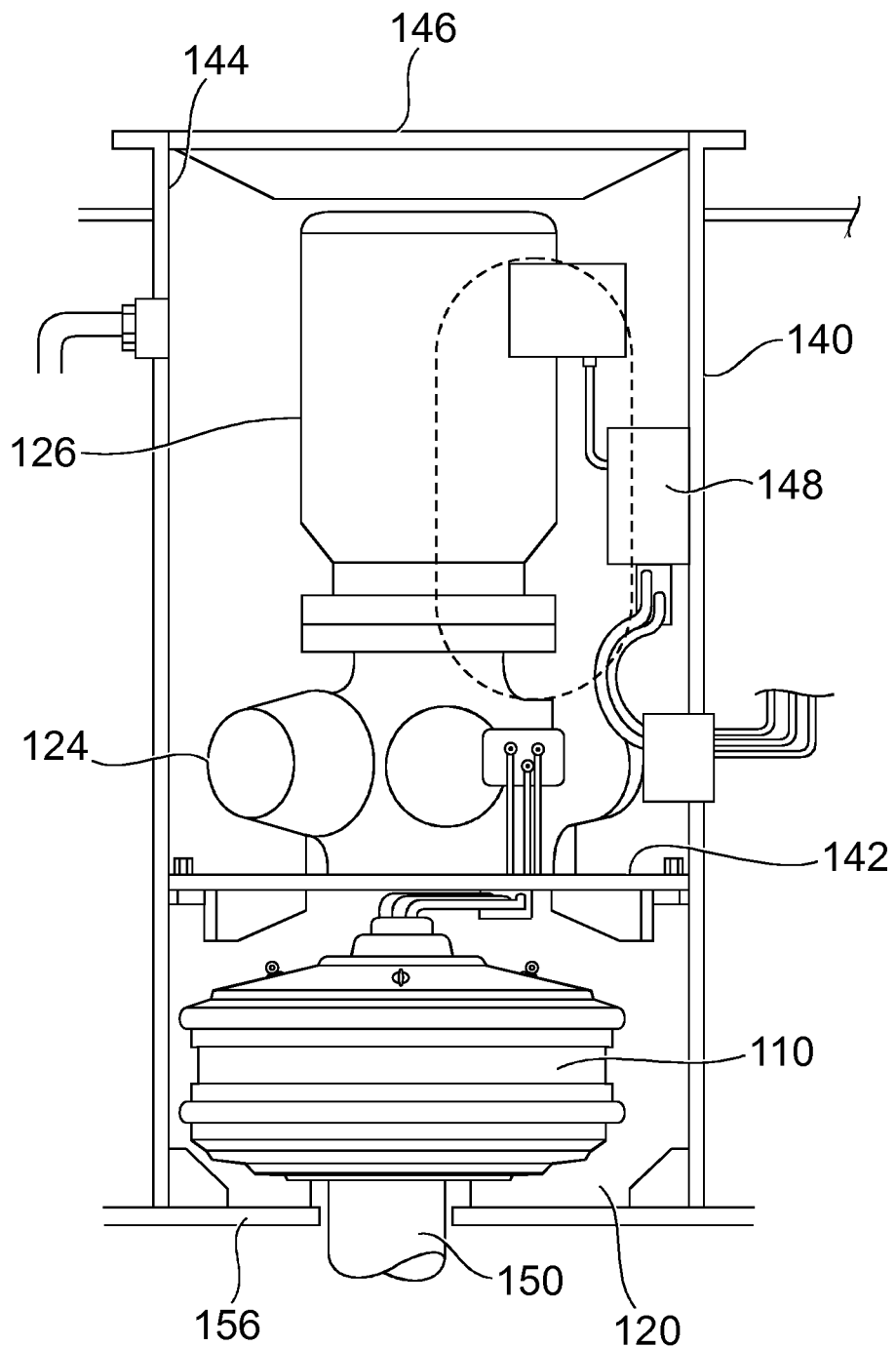
FIG. 7 shows a silo of the hub of another tidal stream generator according to the present invention.

In one embodiment, illustrated in FIG. 7, each generator chamber 122 and its associated pump chamber 120 together form a watertight silo 140. The generator chamber 122 is separated from the pump chamber 120 by a removable watertight bulkhead 142. The generator chamber 122 has an opening 144 in its roof. A removable cover 146 covers and seals the opening. If it is necessary to remove the alternator 126 and/or hydraulic motor 124, for example for replacement or maintenance, the hub may be lifted in a vertical direction on the support column 12 to a maintenance position in which the upper surface of the hub 32 is above the water. The cover 146 can then be removed, for example by an operator standing on the hub 32, and the alternator 126 and/or hydraulic motor 124 can be disconnected, for example by an operator entering the generator chamber 122 from an adjacent access chamber or machinery chamber 128, which may have its own manhole access from the top surface of the hub 32, and which may be connected by watertight access way 148 to the generator chamber 122. The crane 22 can then be used to lift the alternator 126 and/or hydraulic motor 124 from the generator chamber 122 through the opening 144 to the access platform 120, where maintenance can be carried out. Alternatively the crane 22 can lift the alternator 126 and/or hydraulic motor 124 to a support vessel (not shown) for transport to land.

Because the generating apparatus 10 includes a number of generators 126, it can continue to operate and generate electrical power even with one generator 126 removed.

Figure 8:
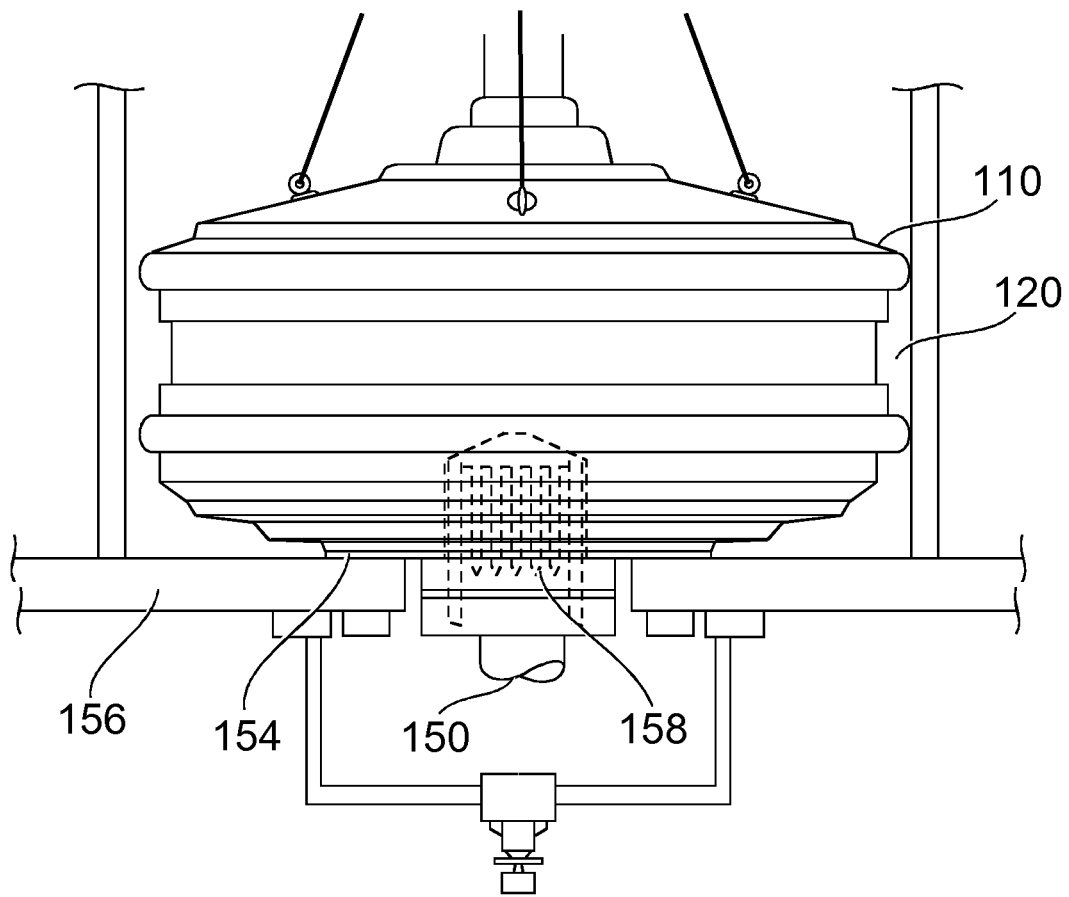
FIG. 8 shows a hydraulic pump mounted in the silo of FIG. 7.

If it is necessary to remove a hydraulic pump 110 for replacement or maintenance, then the alternator 126 and hydraulic motor 124 are first removed as described above. The bulkhead 142 is then removed, by an operator in the generator chamber 122. The hydraulic pump is disconnected from the drive shaft 150 which couples the gear 152 to the pump and drives the hydraulic pump 110. The connection to the drive shaft 150 may be by a simple spline drive 158, so that the pump can be readily lifted away from the drive shaft 150. In the embodiment of FIGS. 7 and 8 the gear 152 and the gear ring 108 are not in a watertight chamber, and so there is an external water pressure sealing gasket 154 between the pump 110 and the floor 156 of the pump chamber 120. To remove the pump 110 from the pump chamber 120 an operator must remove the fixing bolts which fix the pump 110 to the floor 156 of the pump chamber 120. In this example this must be done by a diver, but since the hub has been lifted to the maintenance position, the necessary dive is relatively shallow and straightforward.

Once the pump 110 has been disconnected from the pump chamber 120 the crane 22 can be used to lift the pump 110 from the pump chamber 120 and generator chamber 122 through the opening 144 to the access platform 120, where maintenance can be carried out. Alternatively the crane 22 can lift the pump 110 to a support vessel (not shown) for transport to land.

Figure 3:
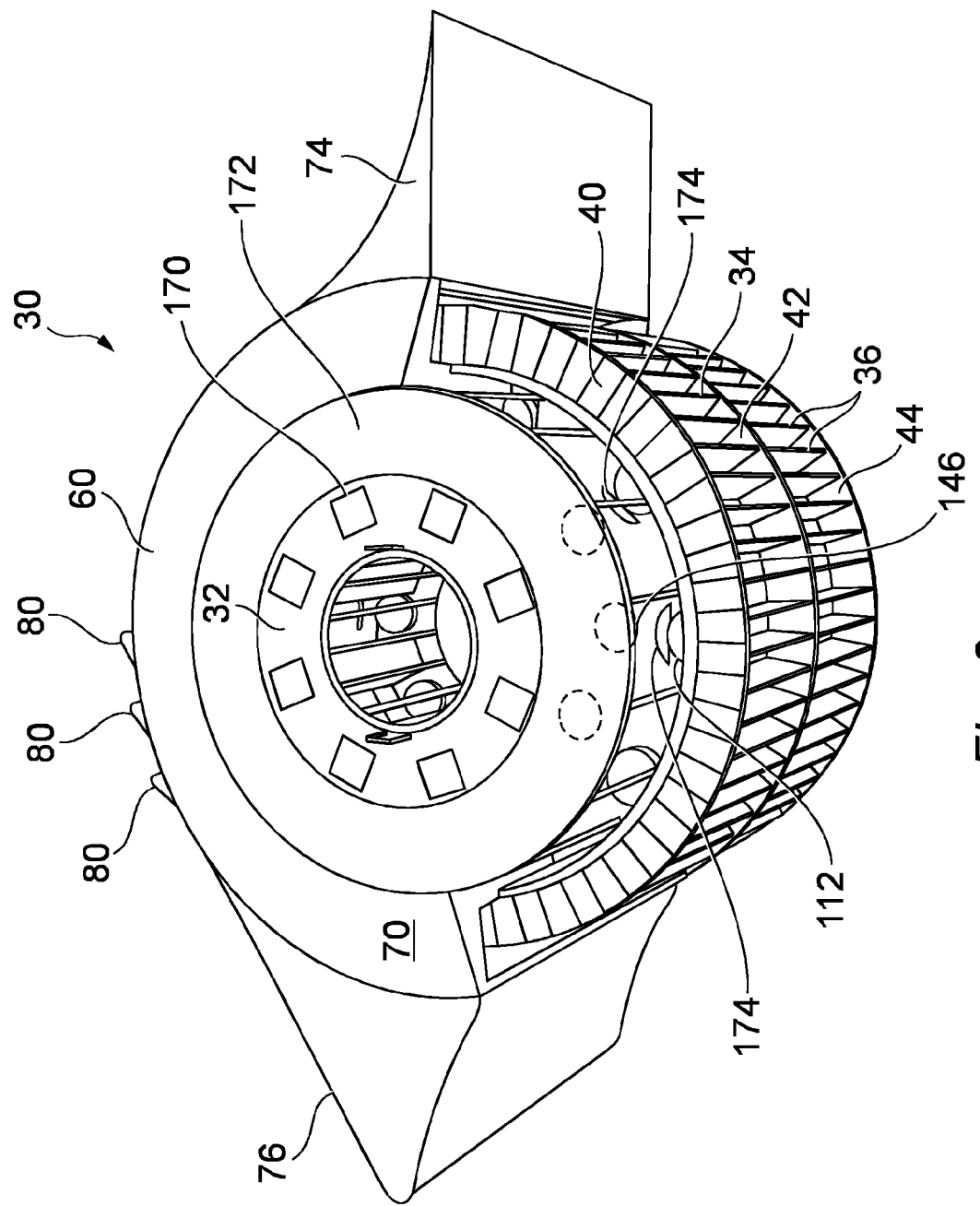
FIG. 3 is an enlarged view of the power wheel, hub and shroud of the tidal stream generator of FIG. 1
Figure 9:
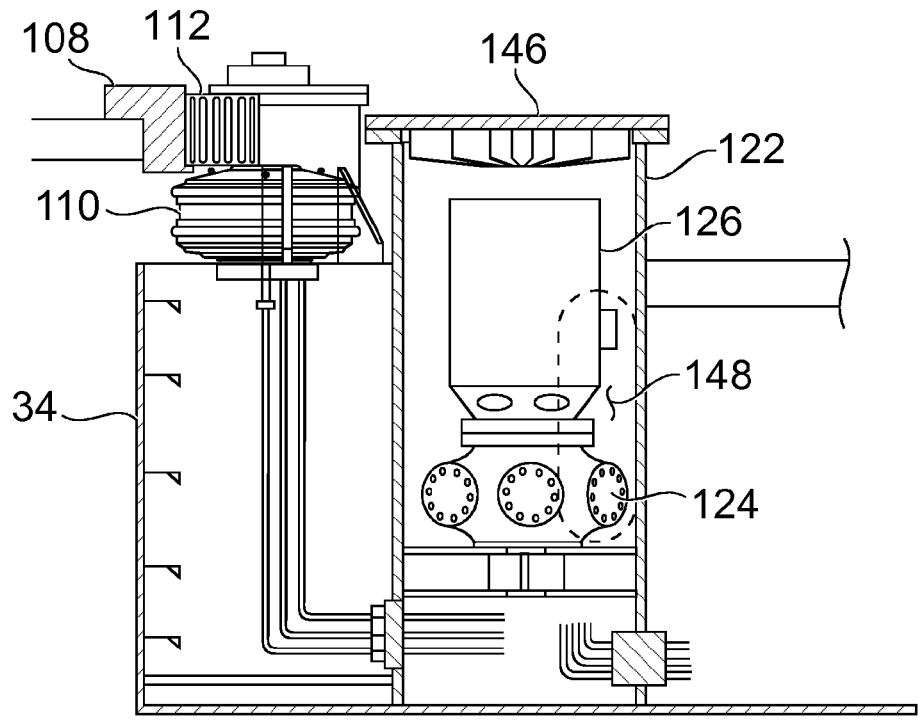
FIG. 9 is a partial sectional view through the hub and power wheel of another tidal stream generator according to the present invention.

In another embodiment, illustrated in FIG. 9, each generator chamber 122 and generator 126 is located inwardly of its associated pump 110. The generator chamber 122 forms a watertight silo 140 and has an opening 144 in its roof. A removable cover 146 covers and seals the opening, as shown in FIG. 3. If it is necessary to remove the alternator 126, for example for replacement or maintenance, the hub may be lifted in a vertical direction on the support column 12 to a maintenance position in which the upper surface of the hub 32 is above the water. The cover 146 can then be removed, for example by an operator standing on the hub 32, and the alternator 126 and/or hydraulic motor 124 can be disconnected, for example by an operator entering the generator chamber 122 from an adjacent access chamber or machinery chamber 128, which may have its own manhole access 170 from the top surface of the hub 32, and which may be connected by watertight access way 148 to the generator chamber 122. The crane 22 can then be used to lift the alternator 126 and/or hydraulic motor 124 from the generator chamber 122 through the opening 144, as described above.

Figure 4:
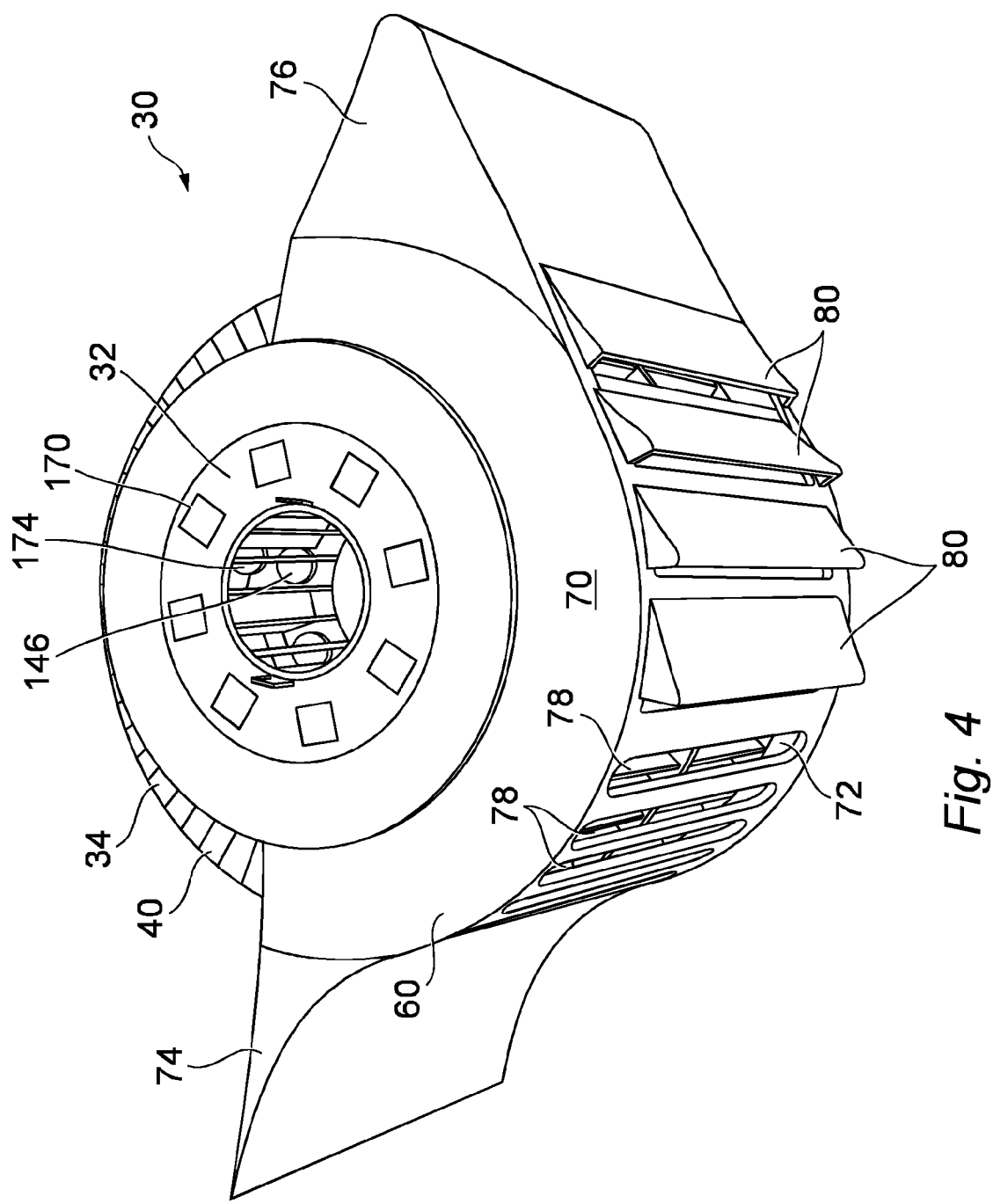
FIG. 4 is an enlarged view of the power wheel, hub and shroud of FIG. 3 from the opposite side.

In the embodiment of FIG. 9 the pump 110 is located on the upper side of the hub 32, so is readily accessible for maintenance purposes. The pinion 112 is coupled to the shaft of the pump 110 and engages the ring gear 108 of the power wheel 34. Pivotable pinion covers 174 may be provided, as shown in FIGS. 3 and 4. In the embodiment of FIGS. 1 to 5 the ring gear 108 is located at the central ring 42 of the power wheel 34, so that rotor vanes extend above and below the ring gear 108. However the ring gear 108 can be located at any suitable level on the power wheel 34. FIGS. 1 to 5 also show a false deck 172 installed above the hub 32, to prevent debris from collecting directly on the hub 32. The hub may include side walls (not shown in FIG. 3) closing the gap between the false deck 172 and the upper side of the hub 32.

Figure 10:
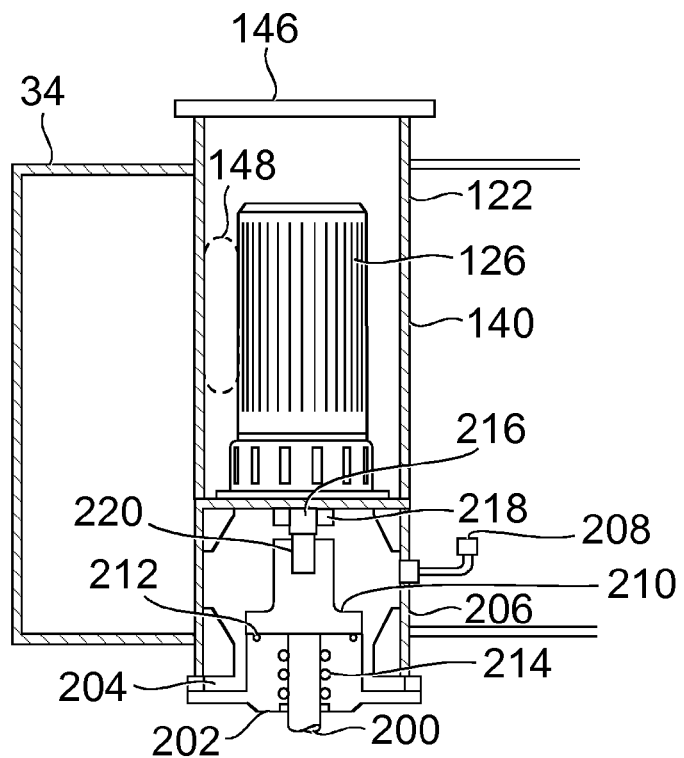
FIG. 10 is a partial sectional view through the hub of another tidal stream generator according to the present invention.

In another embodiment, illustrated in FIG. 10, the hydraulic pumps 110 and hydraulic motors 124 are omitted and replaced by direct transmissions which each transmit a driving force from the power wheel 34 to a drive shaft 200 and hence to the alternator or generator 126. In the example of FIG. 10 the drive shaft 200 is driven directly by a pinion 112 (not shown) which engages with the ring gear 108 of the power wheel 34. However any suitable transmission arrangement may be used, for example a plurality of pinions and gears. The generator 126 is in a watertight silo 140. The drive shaft 200 is exposed to the water, so a seal arrangement is necessary. In the example of FIG. 10 the drive shaft 200 extends through a seal boss 202 in the bottom flange 204 of a pressure chamber 206 directly below the silo 140. An air supply 208 maintains the pressure in the pressure chamber 206 at a pressure greater than the water pressure below the pressure chamber 206. The internal pressure acts on the shoulder 210 of the drive shaft to activate the face seal 212, and back up the seal provided by 'O' rings 214 around the drive shaft. The generator shaft 216 extends through a secondary seal 218 between the silo 140 and the pressure chamber 206. A spline connection 220 connects the generator shaft 216 and the drive shaft 200. The generator 126 can be lifted for maintenance as described above.

The operation of the vertical axis tidal stream generator with a shroud and directional control is as follows.

A shroud 60 is rotationally mounted on the hub 32. The shroud 60 is supported on the hub 32 by bearings 62, 64, 66 so that the shroud 60 is free to rotate independently of the hub 32, which is prevented from rotation by a torque key 50, which fixes it rotationally to the column 12. The torque key 50 can be provided as a projecting portion on the hub 32, to engage with a channel on the support structure 12, or the torque key 50 can be provided as a longitudinally extending rib or flange on the support structure 12 to engage with a recess provided on the hub 32.

The shroud 60 includes hydraulic brakes (not shown) which can lock the shroud 60 to the hub 32 to prevent rotation during maintenance and lifting or raising.

The shroud 60 is open on a first side and has a side wall 68 which encloses the vanes 36 of the power wheel 34 on a second side. The side wall 68 includes upper and lower flanges 70, 72 which enclose the tops and bottoms of the vanes 36 respectively on the second side. The effect of the side wall 68 is to shield the vanes 36 on one side of the power wheel 34 in order to maximise the out of balance forces across the power wheel 34, thereby maximising the power output from the power wheel.

The shroud 60 includes a vane 74 which extends radially outwards at one end of the shroud. The vane 74 serves as a directional controller, in the same way as a weather vane, and steers the shroud 60 so that the vane 74 always points in the direction of the water flow.

The shroud 60 includes a flow separator 76 in a location diametrically opposite the vane 74. The flow separator 76 is shaped so as to divert the flow of water onto the exposed rotor vanes of the power wheel on one side of the generator unit 30, while diverting the flow of water on the other side of the generator unit 30 past the side wall 68, away from the enclosed rotor vanes. Hence it is only the exposed rotor vanes which are subject to the water flow, thereby causing rotation of the power wheel 34.

Figure 12:
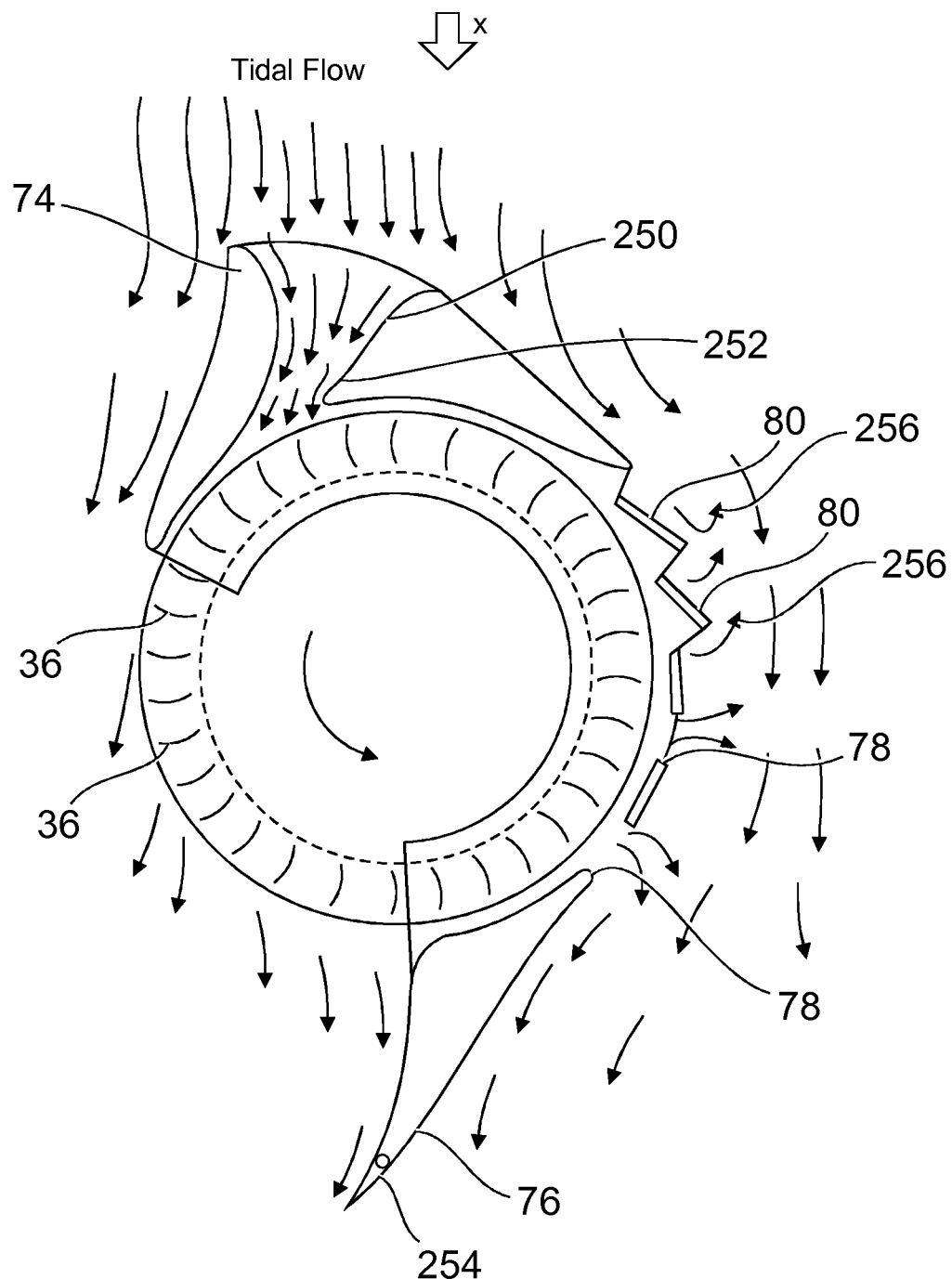
FIG. 12 is a schematic plan view of another embodiment of a shroud of a tidal stream generator according to the present invention.

A variation of the flow separator 76 is shown in FIG. 12. The flow separator includes an inlet duct 250 which includes a venturi passage 252 which accelerates and directs the tidal flow onto the rotor vanes 36. The inlet duct may include pivotally adjustable inlet guide vanes (not shown) adapted to increase the velocity of the water flow onto the rotor vanes 36 of the power wheel 34. Adjustment of the inlet guide vanes may be manually or automatically controlled, for example by hydraulic rams.

The directional controller 74 holds the shroud 60 in a predetermined rotational position relative to the hub 32 dependent on the direction of the water flow. FIG. 12 shows an optional trimming device in the form of a pivotable flange 254 whose position can be controlled to trim the rotational position of the shroud. The trimming device is located at the trailing edge of the directional vane 74, and can be controlled by a servo tab control system which responds to dynamic pressure sensors (not shown) to optimise the dynamic pressure and flow of the water against the rotor vanes 36.

In practice the shroud covers the vanes over an angle of between 170° and 230°, so that there is angle over which exposed rotor vanes 36 extend of between 130° and 190°. However these angles may vary depending on the shape of the shroud 60, the flow separator 76, the directional vane 74, and will be selected to suit the particular tidal conditions.

The shroud side wall 68 may be continuous, or it may include a plurality of vertically extending apertures or slots 78, as shown in FIG. 4. The shroud side wall 68 may also include a plurality of shroud vanes 80 adapted to divert water flow away from the vertical axis, and to prevent water impinging on the rotor vanes 36 as they rotate and travel in a direction opposed to the water flow direction. The shroud vanes 80 serve as vortex generators, so that the water passing on the side of the shroud 60 generate vortices 256 at the trailing edge of each shroud vane 80, thereby reducing the pressure locally and reducing the resistance experienced by the returning rotor vanes 36 inside the shroud 60. The slots 78 allow water carried by the returning rotor vanes 36 to escape and join the flow of water passing the shroud 60, again reducing the pressure locally and reducing the resistance experienced by the returning rotor vanes 36 inside the shroud 60.

The shroud vanes 80 are provided on the upstream part of the shroud side wall 68, that is the part extending from the flow separator 76 to an intermediate point on the shroud wall 68 approximately 90° from the flow separator with respect to the vertical axis.

In practice the shroud 60 will align itself with the flow of water. If the direction of the flow changes, for example with changing tide, the shroud 60 will realign itself with the changed flow of water, whatever the direction of the changed flow. Tidal waters may experience flows in directions other than two opposed directions, and the apparatus of the invention is able to align itself with such flows to ensure that the maximum power is extracted from the flow. The shroud effectively "hunts" for the maximum flow vector and produces the maximum power for any tidal state.

Figure 13:
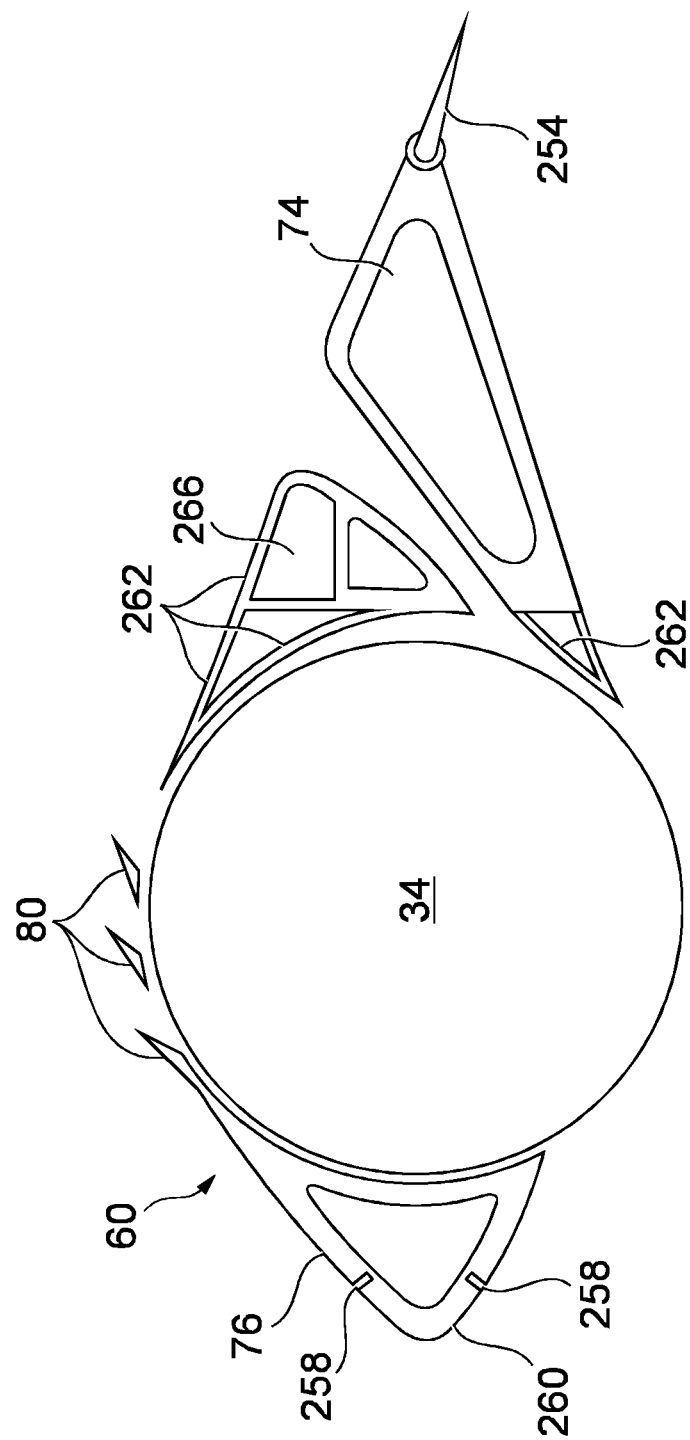
FIG. 13 is a schematic plan view of a further embodiment of a shroud of a tidal stream generator according to the present invention.
Figure 14:
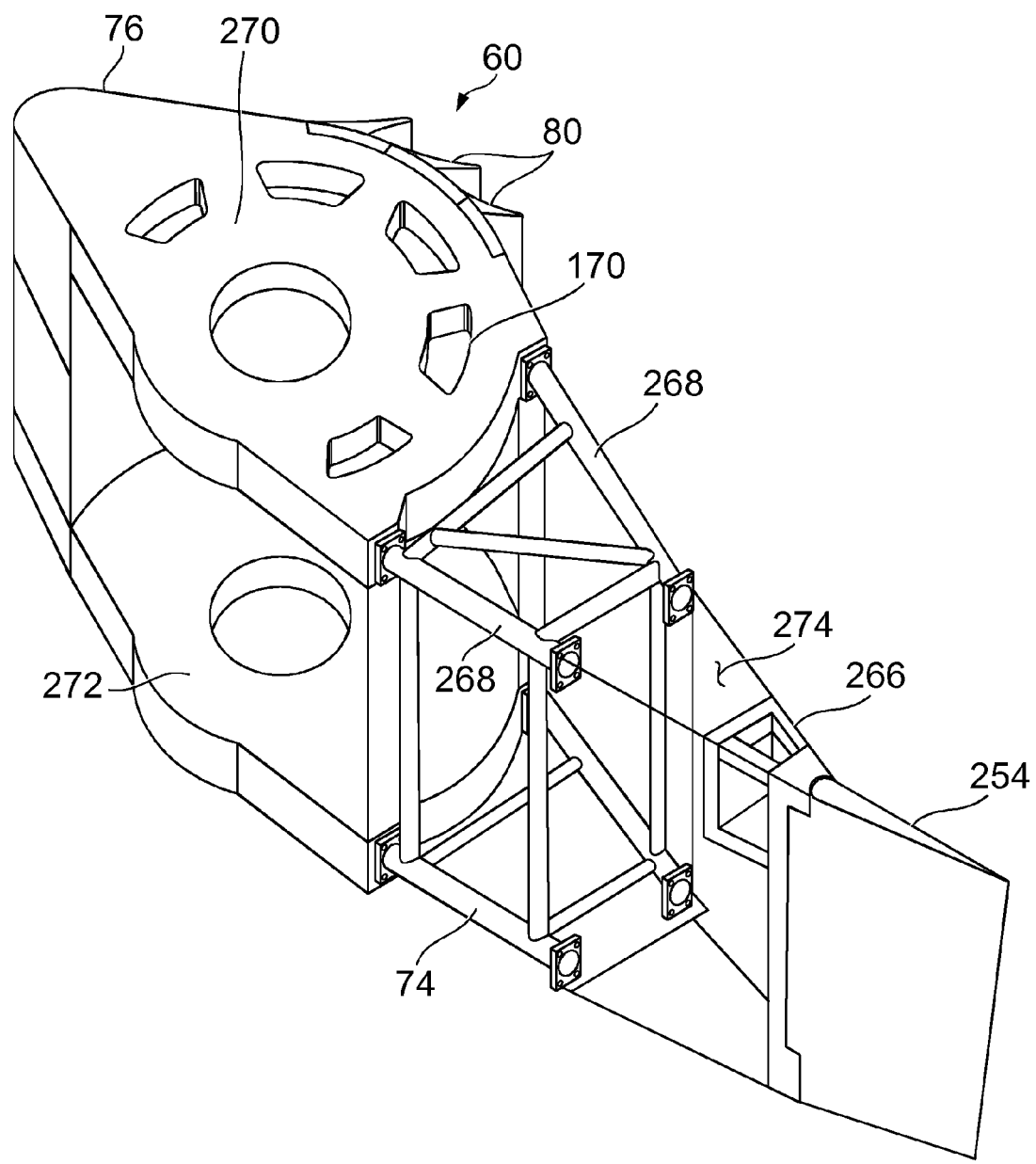
FIG. 14 shows the shroud of FIG. 13 from the side.

FIGS. 13 and 14 show a modified shroud 60 in which the flow separator 76 is hollow and therefore buoyant. The flow separator 76 is provided with flow and/or pressure sensors 258 in the external walls and has a profiled nose section 260. The vane 74 is also constructed with hollow chambers to provide buoyancy. The vane 74 includes fairings 262 which are movable to provide variable clearance to the rotor vanes 36 of the power wheel 34. In this embodiment the vane 74 includes a venture duct 264 therethrough, to improve flow around the power wheel 34. In FIG. 14 the fairings 262 and panels are omitted for clarity, so that the structural frame 268 of the vane 74 can be seen. The vane 74 includes a buoyant chamber 274 and one or more actuation machinery spaces. The shroud 60 includes hollow top and bottom panels 270, 272 which fit over and below the power wheel. The top panel 270 includes a number of service access ports 170. The whole shroud 60 rotates on fixed bearings (not shown) around the power wheel 34, independently of the power wheel rotation. The fixed bearings are supported by the support structure 12 or hub 32. The buoyancy is provided to achieve minimum weight transfer at the bearings.

The active directional control system uses the pressure sensors 258 to sense the dynamic pressure from the tidal flow. It also monitors the rotor speed and any change in the speed to optimise the shroud angle of attack into the tidal stream. The fairings 262, shroud vanes 80 and trimming device 254 all provide control surfaces which can be adjusted and moved by hydraulic means such as pistons, driven by a hydraulic pump mounted in the shroud. The hydraulic pump can be powered separately, or can be powered by the power wheel 34 itself. The pump can also power any electrical apparatus, such as sensors or antifouling systems.

The operation of the tidal stream generator with multiple switchable generating units is as follows.

The apparatus of the invention is able to provide maximum efficiency at any given tidal flow rate, by tailoring the load provided by the generators 126 to the tidal flow rate. In the examples of FIGS. 6 to 9, which include hydraulic pumps 110 and hydraulic motors 124 to drive the generators 126, when the tidal flow rate is at a maximum, the hydraulic fluid is pumped to all eight hydraulic motors 124 to operate all eight generators 126. Of course the number of generators 126 provided on the apparatus can be varied. When the tidal flow rate is reduced, a hydraulic controller (not shown) selects a reduced number of hydraulic motors 124 and only pumps hydraulic fluid to the reduced number of hydraulic motors 124, which then drive a reduced number of generators 126. Alternatively the control of the generators can be achieved by a clutch or other transmission disconnection device in the transmission path to each generator 126, so that the drive from the hydraulic motor 124 to the generator 126 is disconnected and hydraulic fluid continues to flow through the hydraulic motor 124 associated with the disconnected generator 126, but with substantially no flow resistance.

The method by which the number of operating generators 126 is controlled is described below with reference to a hydraulic controller, but the control method is similar when a mechanical or electro-mechanical control is used to control a plurality of clutches to disconnect the drive to each of the generators 126. The invention is not limited to a hydraulic controller, and any means of controlling the generators 126 may be used to switch them between an operative state, in which they act as a load against the rotation of the power wheel 34 and an inoperative state, in which they do not act as a load against the rotation of the power wheel 34. The clutches may of any suitable type for example mechanical, electro-mechanical or electromagnetic.

As the power wheel 34 is rotated by the tidal flow, the ring gear 108 drives the pinions 112, each of which drives the drive shaft 150 of a hydraulic pump 110. The hydraulic pumps 110 pump pressurised hydraulic fluid to a common pressurised fluid supply line.

A sensor (not shown) detects a speed parameter indicative of the relative rotational speed of the power wheel 34 and the hub 32. For example, the relative rotational speed may be measured by an optical sensor which measures the elapsed time between the passing of two reference marks on the power wheel 34 relative to a fixed point on the hub 32.

In one embodiment, hydraulic control means are provided to control the distribution of the pressurised hydraulic fluid in the common pressurised fluid supply line, and to direct flow of the pressurised hydraulic fluid to one or more of the hydraulic motors 124 in response to the detected speed parameter. The hydraulic control means may include valve switching means, to open and close hydraulic fluid paths to each of the hydraulic motors independently. For example, the hydraulic control means may selectively direct flow of the hydraulic fluid to more hydraulic motors 124 when the detected speed parameter is indicative of an increase in the relative rotational speed of the power wheel 34 and the hub 32, or of the relative rotational speed being greater than a predetermined maximum speed. The hydraulic control means may selectively direct flow of the hydraulic fluid to fewer hydraulic motors 124 when the detected speed parameter is indicative of a decrease in the relative rotational speed of the power wheel 34 and the hub 32, or of the relative rotational speed being less than a predetermined minimum speed. As a result, if the relative rotational speed increases, more load is introduced through the connection of more motors 124 and generators 126, thereby bringing the relative rotational speed back down to the optimum speed range. Similarly, if the relative rotational speed decreases, less load is introduced through the connection of fewer motors 124 and generators 126, thereby bringing the relative rotational speed back up to the optimum speed range.

In one embodiment the valve switching means includes a hydraulic valve associated with each hydraulic motor 124. The valve switching means may include a microprocessor to control the valve switching means. The valve switching means may include an electric controller associated with each hydraulic valve, the electric controller being adapted to open or close the associated hydraulic valve in accordance with a control signal from the microprocessor.

Figure 11:
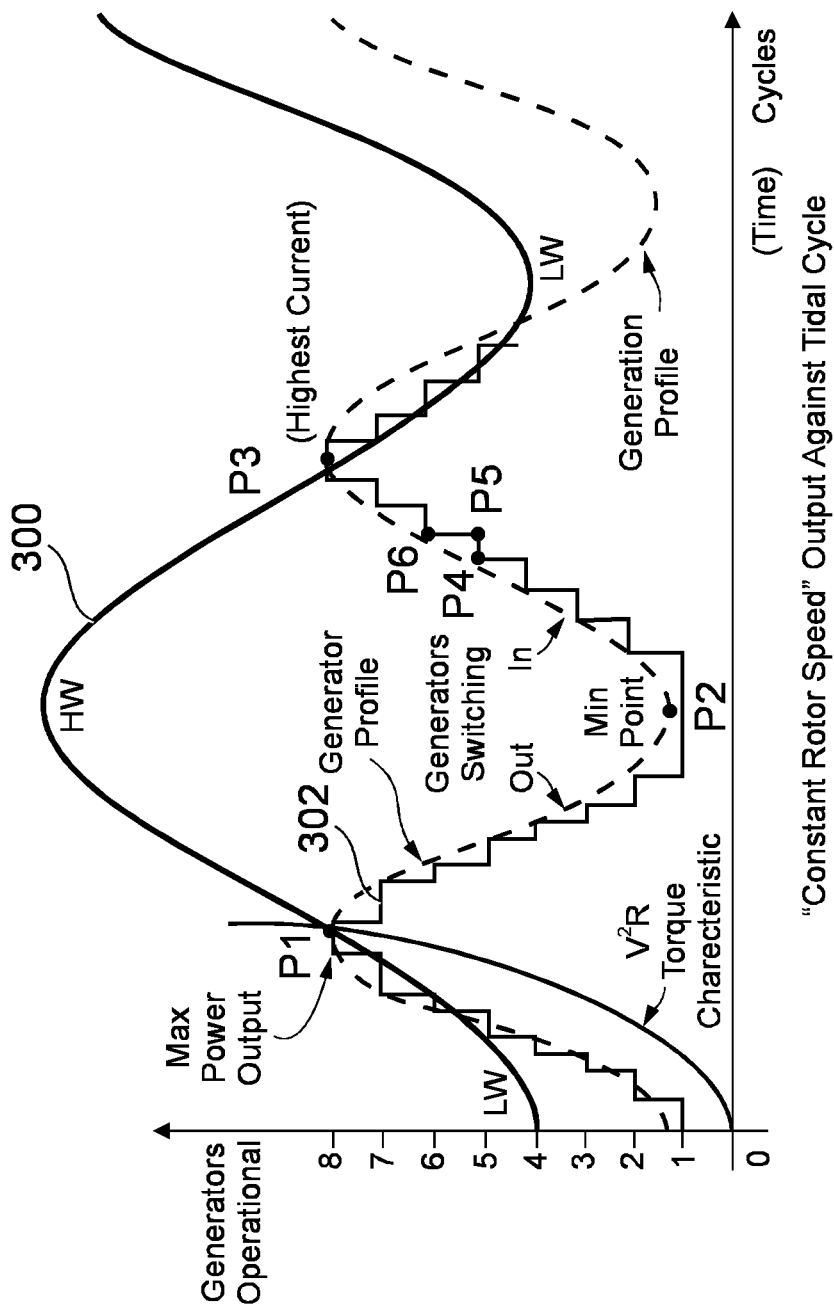
FIG. 11 is a schematic diagram showing the operation over time of the multiple generators of a tidal stream generator according to the present invention.

FIG. 11 shows how the generators 126 are switched between the operative and inoperative state over time in tidal waters. The line 300 shows the level of the tide over a tide cycle from low water, through high water and back to low water. The line 302 shows the number of operative generators 126. At low water LW the current is at its least, and just one generator is operative. More generators 126 are switched in and become operative as the tide flow rate rises in proportion to the tidal current build up, to a maximum of 8 operative generators 126 when the current is at its greatest at point P1, between low water LW and high water HW. One by one the generators 126 are switched out to become inoperative as the current falls until it again reaches a minimum at point P2, corresponding to high water HW, and just one generator is operative. More generators 126 are switched in and become operative as the current rises again, to a maximum of 8 operative generators 126 when the current reaches another peak at point P3, between high water HW and low water LW.

By increasing the number of operative generators as the tidal flow increases, the load on the power wheel increases, and the power wheel rotates at a relatively constant speed, whatever the tidal current. For example at point P4 five generators 126 are operative. As the tidal current increases from point P4 to point P5, the electrical load is constant, but the force on the rotor vanes increases, thereby causing the power wheel 34 to rotate faster. A sensor (not shown) detects that the rotor wheel speed has increased and switches in a sixth generator 126, at point P6, which immediately increases the electrical load, thereby reducing the rotor wheel speed to approximately what it was at point P4.

The ideal generator profile 304 is shown in FIG. 11 and represents the generator power output over time.

Figure 5:
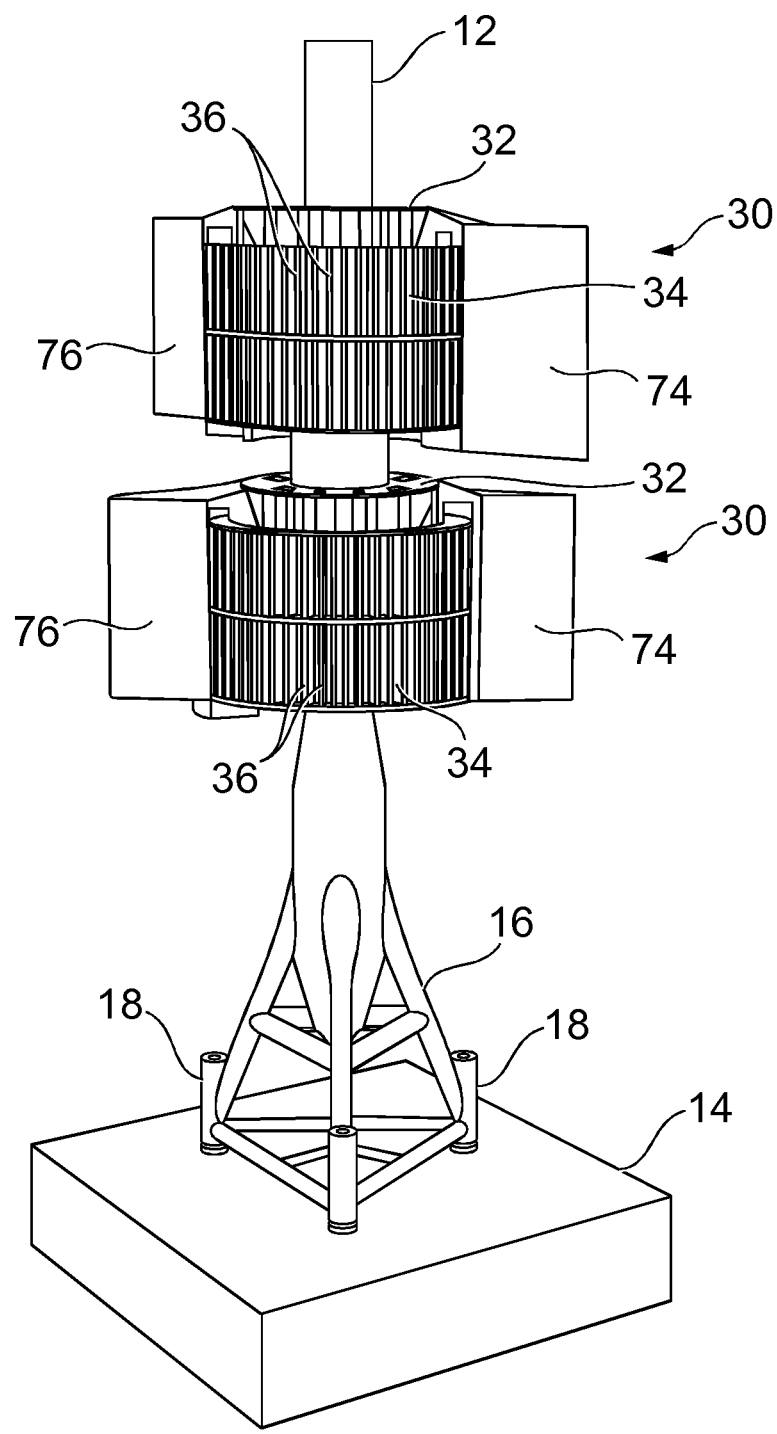
FIG. 5 is a view of another tidal stream generator according to the present invention, having two power wheels, and showing an alternative attachment to the sea bed.

To increase the capacity of the generating apparatus, two or more generating units 30 may be provided on the same support structure, as shown in FIG. 5. The generating apparatus may comprise a plurality of hubs 32, each being rotationally fixed to the support column 12, and each having an associated power wheel 34 arranged for rotation about a substantially vertical axis about the hub 32 and provided with rotor vanes 36 adapted to cause rotation of the power wheel 34 when the power wheel 34 is subject to a substantially horizontal water flow to drive one or more generators 136 provided on the hub 32.

The invention provides an efficient way of constructing a tidal stream generator in any depth of water. The generator unit 30 can operate at any chosen level in the water, since it can be readily lifted to the surface for maintenance. The depth of operation is not limited by the requirement for access to the generator unit 30 while it is in operation. The generator unit 30 can be positioned at the level of highest current flow rates.

The support structure 12 does not require moving parts inside, so can be constructed simply and efficiently. The support structure 12 does not require a longitudinal slot for access to the inside of the structure, so it can be fabricated economically, since it is not weakened by the provision of the longitudinal slot.

The generator unit 30 is free to rotate about the vertical axis so that it will always orientate itself with the direction of maximum tidal flow. This means that the apparatus can be installed in areas which have changing tidal currents, and the apparatus will generate maximum power no matter what the direction of the tidal flow.

The generator unit 30 is readily maintainable, and does not require expensive diving operations to access the serviceable parts, such as hydraulic pumps 110, hydraulic motors 124 and generators 126. Regular maintenance operations, such as cleaning the rotor vanes 36, can be carried out while the generator unit 30 is lifted to its floating, maintenance position, in which the upper portion of each rotor vane 36 is above the water and can be cleaned from a surface vessel, while the lower portion of each rotor vane 36 is just below the water level, and can be cleaned by reaching from a surface vessel or by a shallow diving operation. The rotor vanes 36 may incorporate an active anti-fouling means to minimise the need for manual and/or mechanical cleaning of the rotor vanes 36. The rotor vanes 36 are individually replaceable, so that any rotor vane 36 can be replaced while the generator unit 30 is lifted to its floating, maintenance position, in the event of damage or excessive wear to the rotor vane.

The apparatus can be used in any depth of water, from 10 m to 100 m or more, if a suitable support structure is used. In deep water a framed structure can be used on the seabed, with a column extending from the framed structure to the surface. The support structure can include a gravity base foundation, and the complete structure, including the gravity base foundation, can be floated to the desired location and installed by submerging the foundation onto the seabed, thereby providing rapid installation of a fully pre-commissioned generating unit.

The apparatus can operate efficiently over a range of tidal flow rates, by adapting the load on the wheel to the flow rate, through varying the number of operational generators, so that the wheel rotates at an optimum speed whatever the tidal flow rate. Since the wheel rotates at a substantially constant optimum speed, each of the operational generators, when active, operates at a substantially constant optimum speed.

The apparatus is efficient since it balances the inertial effect of the moving parts. Typically it can produce up to between 1 and 3 MW in a 4 knot current using a single generator unit of about 6 m in height.

The apparatus is environmentally friendly since the rotor vanes 36 do not travel faster than the tidal current, so do not present a danger to marine life.

Because no parts of the apparatus move faster than the tide, there are no trailing vortices, so there is minimal disturbance to tidal flow downstream of the apparatus, and a further apparatus can be placed relatively closely without compromising the efficiency of either apparatus. Hence the apparatus of the invention allows a greater density of power generating capacity per unit area than other generating systems. Furthermore the lack of trailing vortices means that there is no scour, so the apparatus does not cause environmental damage to the seabed.

The apparatus does not need a heavy lift vessel for installation because it floats and can be floated and towed to the installation site. It can be assembled onshore. It can be tested onshore by applying electric power to the generator outputs to drive the drive wheel. It can be floated out as a completely assembly, with the power wheel 34 and hub 32 mounted on the support structure 12, then when it is at the installation site the apparatus can be sunk and fixed to the seabed. The support structure 12 can include a submersible gravity base.

It presents only a minimal disturbance to shipping. Typically the hub 32 and power wheel 34 are at least 5 m below the lowest water level in operation so that a support vessel can pass freely over them, leaving only the support structure projecting above the sea surface.

The invention claimed is:

1. A generating apparatus for converting kinetic energy from a substantially horizontal water flow to electrical energy, the apparatus comprising:
    a support structure;
    a hub which is rotationally fixed to the support structure;
    a hub level controller adapted to control the level of the hub on the support structure;
    a power wheel arranged for rotation about a substantially vertical axis about the hub and provided with rotor vanes adapted to cause rotation of the power wheel when the power wheel is subject to a substantially horizontal water flow;
    a shroud rotationally mounted on the hub and arranged to cover at least some of the rotor vanes of the power wheel;
    a directional controller adapted to hold the shroud in a predetermined rotational position relative to the hub dependent on the direction of the substantially horizontal water flow; and
    at least one generator provided on the hub and adapted to produce electrical power output derived from rotation of the power wheel relative to the hub.

2. A generating apparatus according to claim 1, wherein the power wheel and the shroud each have controlled buoyancy.

3. A generating apparatus according to claim 1, wherein the shroud extends over at least 180° and substantially covers at least half of the rotor vanes of the power wheel at any instant.

4. A generating apparatus according to claim 1, wherein the shroud substantially covers at least some of the rotor vanes moving in a direction opposed to the direction of the substantially horizontal water flow.

5. A generating apparatus according to claim 1, wherein the shroud includes a plurality of vertically extending apertures adjacent to rotor vanes moving in a direction opposed to the direction of the substantially horizontal water flow.

6. A generating apparatus according to claim 1, wherein the shroud includes a plurality of shroud vanes adapted to divert water flow away from the vertical axis.

7. A generating apparatus according to claim 6, wherein the shroud vanes are adapted to create regions of low pressure adjacent to at least some of the rotor vanes moving in a direction opposed to the direction of the substantially horizontal water flow.

8. A generating apparatus according to claim 1, wherein the directional controller comprises a directional vane connected to the shroud and extending radially away from the shroud.

9. A generating apparatus according to claim 8, wherein the directional vane includes a trimming device adapted to trim the rotational position of the shroud.

10. A generating apparatus according to claim 8, wherein the directional controller comprises a flow separator connected to the shroud radially in a location substantially diametrically opposite the directional vane, the flow separator being shaped so as to divert at least part of the substantially horizontal water flow onto the rotor vanes of the power wheel.

11. A generating apparatus according to claim 1, wherein the support structure comprises a substantially vertical support column.

12. A generating apparatus according to claim 1, wherein the support structure comprises one or more guide means which engage with one or more key means on the hub to prevent relative rotation of the support structure and hub.

13. A generating apparatus according to claim 1, wherein the hub level controller comprises one or more floodable ballast chambers provided on the hub.

14. A generating apparatus according to claim 1, wherein each generator is provided in a generator chamber having an opening in a roof of said generator chamber and a removable cover sealably covering said opening.

15. A generating apparatus according to claim 14, further including a crane provided on the support structure and adapted to lift any one of said generators.

16. A generating apparatus according to claim 1, wherein the apparatus includes a plurality of transmissions provided on the hub, each transmission being adapted to transmit a driving force from the power wheel to drive one or more generators.

17. A generating apparatus according to claim 1, wherein the generating apparatus comprises a substantially vertical support column and a plurality of hubs, each hub being rotationally fixed to the support column, and each hub having an associated power wheel arranged for rotation about a substantially vertical axis about the hub and provided with rotor vanes adapted to cause rotation of the power wheel when the power wheel is subject to a substantially horizontal water flow to drive one or more generators provided on the hub.

18. A generating apparatus according to claim 1, the apparatus further comprising:
a plurality of generators provided on the hub and adapted to produce electrical power output derived from rotation of the power wheel relative to the hub, each generator having an associated drive means driven by rotation of the power wheel; and
generator control means adapted to selectively switch each of said plurality of generators between an active state and an inactive state.

19. A generating apparatus according to claim 18, wherein the generator control means includes an electrical controller adapted to selectively switch each of said plurality of generators on and off.

20. A generating apparatus according to claim 18, wherein the generator control means includes a sensor for detecting a speed parameter indicative of the relative rotational speed of the power wheel and the hub.

21. A generating apparatus according to claim 18, wherein the generator control means includes switching means adapted to switch each of said plurality of generators between an active state and an inactive state in response to the detected speed parameter.

22. A generating apparatus according to claim 21, wherein the generator control means is adapted to switch more generators to an active state when the detected speed parameter is indicative of an increase in the relative rotational speed of the power wheel and the hub.

23. A generating apparatus according to claim 21, wherein the generator control means is adapted to switch a generator to an active state when the detected speed parameter is indicative that the relative rotational speed of the power wheel and the hub has reached a predetermined upper trigger value.

24. A generating apparatus according to claim 21, wherein the generator control means is adapted to switch a generator to an inactive state when the detected speed parameter is indicative that the relative rotational speed of the power wheel and the hub has reached a predetermined lower trigger value.

25. A generating apparatus according to claim 24, wherein the apparatus includes a primary transmission comprising a ring gear fixed to the power wheel and adapted to drive each of the primary drivers.

26. A generating apparatus according to claim 18, wherein each drive means comprises:
a primary driver driven by the power wheel;
a drive shaft for driving the associated generator; and
a transmission coupled between the primary driver and the drive shaft.

27. A generating apparatus according to claim 26, wherein each drive means includes a clutch to selectively engage or disengage the generator from the drive shaft.

28. A method of generating electricity from a substantially horizontal water flow in a body of water using a generating apparatus including a power wheel arranged for rotation about a substantially vertical axis about a hub rotationally fixed to a support structure, the power wheel having a plurality of rotor vanes, the method comprising the steps of:
providing a shroud rotationally mounted on the hub and arranged to cover at least some of the rotor vanes of the power wheel;
moving the hub in a vertical direction on the support structure to an operating position in the substantially horizontal water flow;
fixing the hub in an operating position in the substantially horizontal water flow;
aligning the shroud with the substantially horizontal water flow such that the rotor vanes on a first side of the generating apparatus are not covered by the shroud and are subject to hydrodynamic forces from the substantially horizontal water flow, and such that the rotor vanes on a second side of the generating apparatus are at least partially covered by the shroud so as to at least partially shield the rotor vanes from hydrodynamic forces from the substantially horizontal water flow;
driving the power wheel to rotate about the hub by means of the hydrodynamic forces from the substantially horizontal water flow on the rotor vanes provided on the power wheel; and
driving one or more generators provided on the hub from the rotation of the power wheel,
wherein the generating apparatus is a generating apparatus according to claim 1.

29. A method of generating electricity from a substantially horizontal water flow in a body of water using a generating apparatus including a power wheel arranged for rotation about a substantially vertical axis about a hub rotationally fixed to a support structure, the power wheel having a plurality of rotor vanes, the method comprising the steps of:
providing a shroud rotationally mounted on the hub and arranged to cover at least some of the rotor vanes of the power wheel;
moving the hub in a vertical direction on the support structure to an operating position in the substantially horizontal water flow;
fixing the hub in an operating position in the substantially horizontal water flow;
aligning the shroud with the substantially horizontal water flow such that the rotor vanes on a first side of the generating apparatus are not covered by the shroud and are subject to hydrodynamic forces from the substantially horizontal water flow, and such that the rotor vanes on a second side of the generating apparatus are at least partially covered by the shroud so as to at least partially shield the rotor vanes from hydrodynamic forces from the substantially horizontal water flow;
driving the power wheel to rotate about the hub by means of the hydrodynamic forces from the substantially horizontal water flow on the rotor vanes provided on the power wheel; and
driving one or more generators provided on the hub from the rotation of the power wheel.

30. A method according to claim 29, wherein the step of aligning the shroud is carried out by providing a directional controller on the shroud adapted to hold the shroud in a predetermined rotational position relative to the hub dependent on the direction of the substantially horizontal water flow.

31. A method according to claim 29, wherein the directional controller comprises a directional vane connected to the shroud and extending radially away from the shroud, and the step of aligning the shroud includes allowing the shroud to adopt an equilibrium position such that the directional vane is substantially aligned with the substantially horizontal water flow.

32. A method according to claim 29, wherein the step of aligning the shroud includes the further step of trimming the rotational position of the shroud by adjusting the position of a pivotable flange at the trailing edge of the directional vane.

33. A method according to claim 29, including the further step of separating the substantially horizontal water flow at the generating apparatus so as to divert at least part of the substantially horizontal water flow onto the rotor vanes of the power wheel on the first side of the generating apparatus and to divert at least part of the substantially horizontal water flow past the shroud on the second side of the generating apparatus.

34. A method according to claim 33, wherein the separating step is carried out by a flow separator connected to the shroud radially in a location substantially diametrically opposite the directional vane.

35. A method according to claim 29, including the step of providing a plurality of vertically extending apertures adjacent to rotor vanes moving in a direction opposed to the direction of the substantially horizontal water flow and creating a region of reduced pressure adjacent to at least some of the plurality of vertically extending apertures.

36. A method according to claim 29, including the step of providing a plurality of shroud vanes and creating regions of low pressure adjacent to at least some of the rotor vanes moving in a direction opposed to the direction of the substantially horizontal water flow.

37. A method according to claim 29, further including the step of selecting an optimum level in the substantially horizontal water flow and moving the hub in a vertical direction on the support structure to an operating position at said level.

38. A method according to claim 29, wherein the step of moving the hub to an operating position includes flooding one or more floodable ballast chambers provided on the hub.

39. A method according to claim 29, further including the step of lifting the hub in a vertical direction on the support structure to a maintenance position in which at least part of the generating apparatus is above the surface of the body of water.

40. A method according to claim 39, wherein the step of lifting the hub to a maintenance position includes displacing water from one or more floodable ballast chambers provided on the hub.

* * * * *